(12) United States Patent
Tsukamoto et al.

(10) Patent No.: US 6,525,165 B1
(45) Date of Patent: Feb. 25, 2003

(54) TRIMETHYLENE-2, 6-NAPHTHALENE DICARBOXYLATE (CO)POLYMER FILM, QUATERNARY PHOSPHONIUM SULFONATE COPOLYMER AND COMPOSITIONS THEREOF

(75) Inventors: Ryoji Tsukamoto, Matsuyama (JP); Takafumi Kudo, Matsuyama (JP); Masahiko Kosuge, Matsuyama (JP); Tomokatsu Ura, Matsuyama (JP); Hideshi Kurihara, Matsuyama (JP); Shinichi Kawai, Sagamihara (JP); Shinya Watanabe, Sagamihara (JP); Koji Furuya, Sagamihara (JP); Makoto Handa, Sagamihara (JP); Kenji Suzuki, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/720,991

(22) PCT Filed: Jul. 2, 1999

(86) PCT No.: PCT/JP99/03584
§ 371 (c)(1),
(2), (4) Date: Jan. 3, 2001

(87) PCT Pub. No.: WO00/01759
PCT Pub. Date: Jan. 13, 2000

(30) Foreign Application Priority Data

Jul. 3, 1998 (JP) .......................... 10-188869
Jul. 3, 1998 (JP) .......................... 10-188873
Sep. 30, 1998 (JP) .......................... 10-277923

(51) Int. Cl.$^7$ ............................................. C08G 63/00
(52) U.S. Cl. ................... 528/308; 528/272; 528/287; 528/293; 528/294; 528/295
(58) Field of Search ................ 528/272, 287, 528/293, 294, 308

(56) References Cited

U.S. PATENT DOCUMENTS 5,879,813 A * 3/1999 Tanaka et al. .............. 428/483

FOREIGN PATENT DOCUMENTS

| JP | 43-019108 | 8/1943 | |
|----|-----------|--------|-|
| JP | 50-30994 | 3/1975 | |
| JP | 59-64624 | 4/1984 | .......... C08G/63/18 |
| JP | 60-501060 | 7/1985 | .......... C08G/63/66 |
| JP | 1-103623 | 4/1989 | |
| JP | 11-130880 | 5/1989 | |
| JP | 1-229040 | 9/1989 | |
| JP | 7-70341 | 3/1995 | .......... C08G/5/18 |
| JP | 8-283545 | 10/1996 | |
| JP | 9-300567 | 11/1997 | |
| JP | 9-302204 | 11/1997 | .......... C08L/67/02 |
| JP | 10-17663 | 1/1998 | |
| JP | 10-149914 | 6/1998 | .......... H01G/4/18 |
| JP | 10-149944 | 6/1998 | |
| JP | 11-80335 | 3/1999 | |
| JP | 11-80616 | 3/1999 | |
| JP | 11-130879 | 5/1999 | |
| JP | 11-130880 | 5/1999 | .............. C08J/5/18 |

OTHER PUBLICATIONS

Notification No. 20 of the Ministry of Health and Welfare in 1982, Title: Piercing Strength Test, (1996).

"Block copolyether esters with poly(trimethylene 2,6–naphthalenedicarboxylate) segments: effect of composition on thermal properties", Ruey–Shi Tsai, et al, (Department of Chemical Engineering, National Tsing–Hua University, Hsinchu 30043, Taiwan), J. Polym. Res., 5(2), 77–84, 1998 Polymer Society, Abstract.

* cited by examiner

Primary Examiner—Edward J. Cain
(74) Attorney, Agent, or Firm—Sughrue Mion, PLLC

(57) ABSTRACT

An aromatic polyester film, which comprises an aromatic polyester comprising 2,6-naphthalenedicarboxylic acid as the main dicarboxylic acid component and 1,3-propanediol as the main diol component and having a density of at least 1.310 g/cm$^3$. A laminated film comprising another polyester layer can be formed from this aromatic polyester film. An aromatic polyester containing a small amount of a sulfonic acid phosphonium salt used as one of the aromatic polyesters forming this laminated film is excellent in electrostatic casting properties and resistance to the contamination of an electrostatic wire, and an aromatic polyester containing an inorganic anti-fungus agent is used for antifungal application.

53 Claims, No Drawings

TRIMETHYLENE-2, 6-NAPHTHALENE DICARBOXYLATE (CO)POLYMER FILM, QUATERNARY PHOSPHONIUM SULFONATE COPOLYMER AND COMPOSITIONS THEREOF

FIELD OF THE INVENTION

The present invention relates to a film of a trimethylene-2,6-naphthalene dicarboxylate (co)polymer comprising a 2,6-naphthalene dicarboxylic acid component and a 1,3-propanediol component, a sulfonic acid quaternary phosphonium salt copolymer and a composition thereof.

PRIOR ART

Polyethylene terephthalate (may be abbreviated as PET hereinafter) is widely used as molded products such as films exemplified by magnetic recording tapes, capacitors, ink ribbons and thermally shrinkable labels for PET bottles, sheets exemplified by trays, hollow containers and cover materials thereof, and PET bottles thanks to its excellent mechanical and chemical properties as a material.

However, PET is not satisfactory yet in terms of gas barrier properties against oxygen and carbon dioxide though it is superior to polyethylene and polypropylene. The further improvement of gas barrier properties of PET is desired when it is used to wrap contents which are easily oxidized, such as food containing oil, and when it must prevent the leakage of filled gas like carbonated drinks.

To improve the gas barrier properties of PET, there are known methods of coating or laminating a resin having higher gas barrier properties than PET, such as polyvinylidene chloride, ethylene-vinyl acetate copolymer saponified product or polyamide. These resins have poor adhesion to PET, thereby causing delamination, whereby a container loses its transparency, and a laminate consisting of different types of polymers is disadvantageous from the viewpoint of recovery.

There are proposed a method of using a polymer obtained by substituting part or all of the terephthalic acid component of PET with isophthalic acid in place of PET (JP-A 59-64624) (the term "JP-A" as used herein means an "unexamined published Japanese patent application") and a method of improving gas barrier properties by copolymerizing 1,3-phenylene dioxydiacetic acid or the like (JP-A 60-501060). Both methods involve such problems that satisfactory gas barrier properties are not achieved, a reduction in glass transition temperature (Tg) is large and heat resistance deteriorates.

An ethylene-vinyl acetate copolymer (to be abbreviated as EVOH hereinafter), polyamides (to be abbreviated as PA hereinafter) and polyvinylidene chloride (to be abbreviated as PVDC hereinafter) are used as polymers having higher gas barrier properties than the above polyester. However, the gas barrier properties of EVOH and PA greatly depend upon humidity and deteriorate at a high humidity. PVDC may generate a poisonous gas such as dioxin when it is burnt.

PET films and PA films are widely used for packing as a film having high piercing strength and high piercing resistance. However, as these films have high tear strength, when they are used in a wrapping bag and their contents are to be taken out from the wrapping bag, the bag cannot be easily ripped open and it takes time to take out the contents.

To provide tearability to a film, the end of the film is notched or slit, or an uniaxially stretched film of a polyamide or polyolefin is used as an inner layer and laminated with a polyester to produce a film. These methods boost costs, disadvantageously. It is desired that a film itself should have tearability if possible.

Thus, a film which is easily torn while it has high piercing strength is unknown. If a film having both piercing resistance and tearability is obtained, it is expected to be used in a wide range of fields including packing materials.

Poly(methylene-2,6-naphthalene dicarboxylate) itself is disclosed by JP-B 43-19108 (the term "JP-B" as used herein means an "examined Japanese patent publication") which discloses a composite filament or composite staple fiber and the other polyester thereof which is produced in the presence of a polymer comprising trimethylene dinaphthalate as a polymerization unit, that is, a mixture of poly(trimethylene dinaphthalate), poly(trimethylene-2,6-dinaphthalate)Mn $(OAc)_2$ and $Ti(OBu)_4$ as a catalyst and which has a relative viscosity of 0.67.

SUMMARY OF THE INVENTION

It is an object of the present invention to provide a film of an aromatic polyester which is superior in gas barrier properties to PET out of polyesters having excellent features that they have small humidity dependence and that they do not generate a poisonous gas when they are burnt.

It is another object of the present invention to provide an aromatic polyester film which is easily torn while it has high piercing strength.

It is still another object of the present invention to provide a film having excellent features which has gas barrier properties equivalent to those of a polyamide film, does not experience an increase in moisture permeability unlike a polyamide film and a reduction in gas barrier properties at a high humidity and does not generate a poisonous gas when it is burnt.

It is a further object of the present invention to provide an aromatic polyester which has excellent adhesion to a rotary cooling drum, and excellent productivity and sanitation because it suppresses the contamination of an electrostatic wire and the adhesion of a sublimate to an extrusion nozzle in the production of a film.

It is a still further object of the present invention to provide an aromatic polyester which decreases the amount of a component eluting from a polyester film without reducing the production efficiency of a film in the production of the film and is suitable for use in packages, especially food packages.

It is a still further object of the present invention to provide an aromatic polyester which can decrease the amount of an oligomer eluting from a polyester film without reducing the production efficiency of a film in the production of the film.

It is a still further object of the present invention to provide an aromatic polyester which has a small content of foreign matter and is excellent in color, moldability, light resistance and gas barrier properties in the production of a film.

It is a still further object of the present invention to provide an aromatic polyester which gives a film having excellent antifungal properties.

It is a still further object of the present invention to provide a laminated polyester film having a primer layer which is excellent in gas barrier properties, heat resistance, water resistance, anti-block properties and adhesion.

Other objects and advantages of the present invention will become apparent from the following description.

According to the present invention, firstly, the above objects and advantages of the present invention are attained by an aromatic polyester film, (1) which comprises an aromatic polyester comprising 2,6-naphthalenedicarboxylic acid as the main dicarboxylic acid component and 1,3-propanediol as the main diol component and (2) having a density of at least 1.310 g/cm$^3$.

Secondly, the above objects and advantages of the present invention are attained by a laminated polyester film comprising the above aromatic polyester film of the present invention and another polyester layer existent on at least one side of the film.

Thirdly, the above objects and advantages of the present invention are attained by an aromatic polyester which comprises 2,6-naphthalenedicarboxylic acid as the main dicarboxylic acid component and 1,3-propanediol as the main diol component and a sulfonic acid quaternary phosphonium salt having an ester forming functional group in an amount of 0.1 to 45 mmol % based on the total of all the dicarboxylic acid components.

In the fourth place, the above objects and advantages of the present invention are attained by a polyester composition which comprises the above aromatic polyester of the present invention in an amount of 60 wt % or more and another aromatic polyester in an amount of 40 wt % or less based on the total of the aromatic polyester and the another aromatic polyester.

In the fifth place, the above objects and advantages of the present invention are attained by an antifungal polyester composition which comprises any one of the aromatic polyester of the present invention and the above aromatic polyester composition of the present invention and an inorganic anti-fungus agent in an amount of 0.1 to 10 wt % based on the above aromatic polyester of the present invention or the aromatic polyester composition of the present invention.

DETAILED DESCRIPTION OF THE INVENTION

The present invention will be described in detail hereinafter. A description is first given of the aromatic polyester film of the present invention.

As described above, the aromatic polyester film of the present invention, (1) which comprises an aromatic polyester comprising 2,6-naphthalenedicarboxylic acid as the main dicarboxylic acid component and 1,3-propanediol as the main diol component and (2) which has a density of at least 1.310 g/cm$^3$.

In the above aromatic polyester (1), the 2,6-naphthalenedicarboxylic acid as the main dicarboxylic acid component and the 1,3-propanediol as the main diol component are contained in an amount of preferably 80 mol % or more, more preferably 85 mol % or more, much more preferably 90 mol % or more based on the total of all the dicarboxylic acid components and the total of all the diol components, respectively.

In the present invention, dicarboxylic acid components other than 2,6-naphthalenedicarboxylic acid include dicarboxylic acids such as terephthalic acid, isophthalic acid, succinic acid, adipic acid, sebacic acid, phthalic acid, 2,7-naphthalenedicarboxylic acid and 1,4-naphthalenedicarboxylic acid, and ester derivatives thereof. Out of these, terephthalic acid, isophthalic acid and ester derivatives thereof (such as dimethyl terephthalate and dimethyl isophthalate) are preferable. These dicarboxylic acids may be used alone or in combination of two or more. The total amount of dicarboxylic acid components other than 2,6-naphthalenedicarboxylic acid is preferably less than 20 mol % based on the total of all the dicarboxylic acid components in order not to impair the feature of the present invention. It is more preferably less than 15 mol %, particularly preferably less than 10 mol %.

In the present invention, diol components other than 1,3-propanediol include aliphatic glycols such as ethylene glycol, 1,2-propanediol, tetramethylene glycol, hexamethylene glycol, neopentyl glycol, cyclohexane dimethanol and octamethylene glycol; alicyclic glycols such as 1,4-cyclohexane dimethanol; aromatic diols such as bisphenol S, bisphenol A and hydroquinone; and high-molecular glycols such as polyethylene glycol and polypropylene glycol. These diol compounds may be used alone or in combination of two or more. The total amount of diol components other than 1,3-propanediol is less than 20 mol %, preferably less than 15 mol %, more preferably less than 10 mol% based on the total of all the diol components in order not to impair the feature of the present invention.

The above aromatic polyester may contain a component derived from an oxycarboxylic acid such as an aromatic oxyacid exemplified by hydroxybenzoic acid or aliphatic oxyacid exemplified by ω-hydroxycaproic acid in an amount of less than 20 mol % or a polycarboxylic acid such as trimellitic acid or pyromellitic acid or a polyol such as pentaerythritol in a small amount, for example, 3 mol % or less based on the total of all the dicarboxylic acid components if it does not impair the effect of the present invention.

The aromatic polyester in the present invention is particularly preferably a homopolymer consisting of 2,6-naphthalenedicarboxylic acid as a dicarboxylic acid component and 1,3-propanediol as a diol component, or a copolymer comprising, as a copolymerized component, at least one compound selected from the group consisting of dicarboxylic acids other than 2,6-naphthalenedicarboxylic acid and diols other than 1,3-propanediol in an amount of 30 mol % or less based on the total of all the dicarboxylic acid components.

This copolymer can be a copolymer comprising, as a copolymerized component, a sulfonic acid quaternary phosphonium salt having an ester forming functional group in an amount of 0.1 to 45 mmol % based on the total of all the dicarboxylic acid components. This copolymer has excellent adhesion to a rotary drum and suppresses the contamination of an electrostatic wire and the adhesion of a sublimate to an extrusion nozzle in the production of a film.

The polyester in the present invention is substantially linear and has film formability, particularly film formability by melting.

Further, the aromatic polyester of the present invention may contain additives such as a crystal nucleating agent, stabilizer, dye, lubricant, ultraviolet absorber, antioxidant, optical bleaching agent, hard coating agent, dispersant and flame retardant as required.

The aromatic polyester of the present invention may be produced by any conventionally known method.

For example, an ester exchange reaction between an ester derivative such as a dimethyl ester or diethyl ester of 2,6-naphthalenedicarboxylic acid and an aliphatic glycol is carried out by heating in the presence of at least one of compounds containing sodium, potassium, magnesium, calcium, zinc, strontium, titanium, zirconium, manganese or cobalt as a conventionally known ester exchange catalyst and then polymerization is carried out by heating in the presence of a polymerization catalyst under reduced pressure to produce an aromatic polyester. Preferred examples of the polymerization catalyst include antimony compounds, germanium compounds and titanium compounds.

The aromatic polyester of the present invention can also be obtained by the direct polymerization of a dicarboxylic acid and a glycol which is a known method similar to the direct polymerization of PET.

After melt polymerization, the aromatic polyester may be chipped and solid-phase polymerized. A polyester having a higher intrinsic viscosity can be easily obtained by solid-phase polymerization and a film having excellent mechanical strength can be obtained therefrom.

It is desired from the viewpoint of moldability that the aromatic polyester of the present invention should have an intrinsic viscosity measured at 25° C. in an o-chlorophenol solvent of 0.4 to 1.5, preferably 0.5 to 1.3. When the intrinsic viscosity is lower than 0.4, the formed film has poor strength disadvantageously. A polyester having an intrinsic viscosity of more than 1.3 is not preferred because filtration and extrusion molding become difficult when it is molded.

The aromatic polyester film of the present invention includes an unstretched film obtained by extruding a molten polymer from a die or the like and by heating and an uniaxially or biaxially oriented film obtained by stretching the film in a uniaxial or biaxial direction sequentially or simultaneously to orient molecular chains.

Generally speaking, the gas barrier properties of a polymer are connected with the cohesive energy density of polymer molecular chains, free volume fraction indicative of a gap between polymer molecular chains, crystallinity and the degree of orientation of molecular chains. As for the relationship between gas barrier properties and crystallinity out of these, it is said that gas molecules such as oxygen and carbonic acid gases penetrate only amorphous portions of a polymer and not crystal portions. That is, when polymers of the same type are compared with each other, a polymer having higher crystallinity has higher gas barrier properties due to fewer portions which can breathe.

As for the relationship between the degree of orientation and gas barrier properties, the gap between molecular chains becomes smaller as the molecular chains are oriented by stretching rather than in a random state, thereby making it more difficult to transmit gases. When polymers of the same type are compared with each other, a polymer with a higher draw ratio has higher gas barrier properties.

The density of the aromatic polyester film of the present invention is at least 1.310 g/cm$^3$, preferably at least 1.320 g/cm$^3$. The density is an index indicative of crystallinity. When polymers of the same type are compared with each other, a polymer with higher crystallinity has higher density. Therefore, for the above reason, gas barrier properties improve as density increases. The density is preferably 1.366 g/cm$^3$ or less. When crystallinity is too high, gas barrier properties improve but tenacity is lost when a polymer is formed into a film or the like, disadvantageously as practical use.

A stretched film formed from the aromatic polyester of the present invention is preferred because it has higher gas barrier properties than an unstretched film formed therefrom for the above reason.

The biaxially oriented aromatic polyester film of the present invention preferably has a total of Young's moduli in two crossing directions on the film plane of 350 to 1,300 kg/mm$^2$. When the total of Young's moduli is below the above range, the strength of the film becomes insufficient when in use. The total of Young's moduli is more preferably 400 kg/mm$^2$ or more, much more preferably 500 kg/mm$^2$ or more. The film having a total of Young's moduli of more than 1,300 kg/mm$^2$ is not preferred because its delamination resistance deteriorates. The total of Young's moduli is preferably 900 kg/mm$^2$ or less, more preferably 800 kg/mm$^2$ or less.

The biaxially oriented aromatic polyester film of the present invention has a total of breaking strengths in two crossing directions on the film plane of 30 kg/mm$^2$ or more. When the total of breaking strengths is below that range, the strength of the film becomes insufficient when in use. The total of breaking strengths is more preferably 40 kg/mm$^2$ or more, much more preferably 50 kg/mm$^2$ or more.

The plane orientation coefficient (ns) of the biaxially oriented aromatic polyester film of the present invention is preferably 0.02 to 0.3. When the plane orientation coefficient is smaller than 0.02, the strength of the film becomes insufficient disadvantageously. When the plane orientation coefficient is larger than 0.3, the delamination resistance of the film deteriorates disadvantageously. The plane orientation coefficient is more preferably 0.10 to 0.30.

The biaxially oriented aromatic polyester film of the present invention preferably has a ratio of piercing strength to tear strength (piercing strength/tear strength) of 4 or more when it is a 15 μm thick film.

A film for packing must have high piercing strength and low tear strength at the same time. When the film has a large ratio of piercing strength (film pierced strength by a needle with an end portion of 0.5 mm in diameter when it pierces the film at a rate of 50 mm/min) to tear strength (force required for tearing a film per unit thickness) both of which will be defined in the section of Examples, the film can be evaluated as a film having high piercing strength and low tear strength at the same time.

The ratio (of piercing strength/tear strength) is preferably 7.0 or more, more preferably 10.0 or more. When the ratio is smaller than 4, tear strength becomes too high as compared with piercing strength, thereby making it difficult to obtain sufficient piercing resistance and tearability.

The tear strength is particularly preferably 0.25 kg/mm or less.

The biaxially oriented aromatic polyester film of the present invention preferably has a haze of 20% or less to achieve such transparency that its contents can be seen when it is used as a packing material. In order to adjust the haze to less than 20%, stretching and heat treatment conditions are selected to prevent crystallinity from becoming too high and further the amount of inert fine particles added to provide slipperiness to the film is controlled not to become too excessive.

The haze is more preferably 0.01 to 15%, much more preferably 0.03 to 10%.

The aromatic polyester film of the present invention preferably has an oxygen permeability constant at 20° C. and a relative humidity of 90% of 22×10$^{-13}$ (cc·cm/cm$^2$/sec/cmHg) or less.

When the oxygen permeability constant is larger than 22×10$^{-13}$ (cc·cm/cm$^2$/sec/cmHg), oxygen barrier properties at a high humidity are low. The oxygen permeability constant at 20° C. and a relative humidity of 90% is more preferably 15×10$^{-13}$ (cc·cm/cm$^2$/sec/cmHg) or less.

Further, the aromatic polyester film of the present invention preferably has an oxygen permeability constant at 20° C. and a relative humidity of 65% of 22×10$^{-13}$ (cc·cm/cm$^2$/sec/cmHg) or less.

The aromatic polyester film of the present invention has a moisture permeability at 20° C. and a relative humidity of 90% of 30 (g/m$^2$/24 hr) or less when it is a 12 μm thick film.

As the value of moisture permeability increases, water-vapor barrier properties lower, thereby making it difficult to use it to pack contents which are apt to be easily damaged by water vapor, such as dried food. The moisture permeability is preferably 25.0 (g/m$^2$/24 hr) or less, more preferably 20.0 (g/m$^2$/24 hr) or less.

The aromatic polyester film of the present invention preferably has a breaking elongation retention of 50% or more after 150 hours of irradiation at a temperature of 60° C. with a sunshine weatherometer. When the breaking elongation retention is smaller than 50% and the film is exposed to the sunlight for a long time, the film readily becomes defective. The breaking elongation retention is more preferably 60% or more, much more preferably 70% or more.

The aromatic polyester film of the present invention preferably has a transmission of ultraviolet light having a wavelength of 360 nm of 40% or less. When the ultraviolet transmission is more than 40% and the film is used to pack food, the film may modify contents disadvantageously. The ultraviolet transmission is more preferably 30% or less, much more preferably 20% or less.

Preferably, the aromatic polyester film of the present invention has an extractability treated with ion exchange water at 125° C. for 1 hour of 0.0155 mg/cm$^2$ or less. The film showing this extractability can be suitably used for packing, especially packing foods.

More preferably, the aromatic polyester film of the present invention has an oligomer extractability with chloroform of 0.15 wt % or less.

The aromatic polyester film of the present invention may contain a small amount of inert fine particles to provide slipperiness to the film. Examples of the inert fine particles include inorganic particles such as spherical silica, porous silica, calcium carbonate, silica alumina, alumina, titanium dioxide, kaolin clay, barium sulfate and zeolite; and organic particles such as silicone resin particles, crosslinked polystyrene particles and polypropylene particles. The inert particles may be natural or synthetic. Inorganic particles are preferably synthetic rather than natural because they are uniform in diameter. The crystal form, hardness, specific gravity and color of the inert fine particles are not particularly limited.

The average particle diameter of the above inert fine particles is preferably in the range of 0.05 to 5.0 $\mu$m, more preferably 0.1 to 3.0 $\mu$m. When the average particle diameter is smaller than 0.05 $\mu$m, it is difficult to provide sufficient slipperiness and when the average particle diameter is larger than 5.0 $\mu$m, the surface of the film tends to become uneven.

The content of the inert fine particles is preferably 0.001 to 1.0 wt %, more preferably 0.03 to 0.5 wt %. When the content is smaller than 0.001 wt %, it is difficult to provide sufficient slipperiness and when the content is larger than 1.0 wt %, the transparency of the film or sheet is apt to lower.

The inert fine particles added to the film may be composed of one component, two components or multiple components selected from the above examples.

The time of adding the inert fine particles is not particularly limited if it is before or during film formation. The inert fine particles may be added in a polymerization stage or when the film is formed.

Particularly preferably, the inert fine particles are supplied to a vented double-screw kneading extruder to be kneaded as a dispersion containing the inert fine particles dispersed in water and/or an organic compound having a boiling point lower than the melting point of the polyester resin.

Water and/or an organic compound having a boiling point lower than the melting point of the thermoplastic resin are/is used as a medium for the dispersion. Water, methanol, ethanol, ethylene glycol and the like are preferred from an economical point of view and the viewpoint of handling properties. Water is the most preferred medium from the viewpoint of safety.

How to supply the dispersion containing the inert fine particles to the vented double-screw kneading extruder is not particularly limited if it is efficient, safe and quantity determinative and does not affect dispersibility. At least one of vent holes is preferably kept under reduced pressure to remove water and/or the organic compound having a boiling point lower than the melting point of the thermoplastic resin. The vent hole is preferably kept at 100 Torr or less, more preferably 50 Torr or less, much more preferably 30 Torr or less. Otherwise, dispersibility becomes unsatisfactory.

The aromatic polyester film of the present invention preferably has a thickness of 400 $\mu$m or less when it is a biaxially oriented film. A film having a thickness of more than 400 $\mu$m after stretching is not preferred for such production reasons that it is difficult to stretch the film because it is too thick and heat hardly reaches the inside of the film when it is heat set. The biaxially oriented film has a thickness of more preferably 350 $\mu$m or less, the most preferably 250 $\mu$m or less.

The aromatic polyester film of the present invention may be produced by a general method for producing a PET or polyethylene 2,6-naphthalene dicarboxylate (may be abbreviated as PEN hereinafter) film, for example, supplying a polyester raw material to the hopper of a single screw or double screw extruder connected to a T die or I die through a gear pump, melting it in the cylinder of the extruder, extruding it into a sheet form from the die, and cooling it with a casting roll. As for the casting roll, the formed sheet is preferably brought into close contact with the casting roll using an electrostatic adhesion device or air knife to prevent thickness nonuniformity and the inclusion of air.

The aromatic polyester film of the present invention may be produced by conventionally known film production methods which have been used for thermoplastic resins. The methods include, for example, extrusion molding using a T die or I die, inflation extrusion molding using a looped die, cast molding, calender molding, press molding and the like. Any one of uniaxial stretching and biaxial stretching using a roll or tenter which is generally used to form a PET or PEN film is preferably used to form a film. Biaxial stretching may be sequential or simultaneous biaxial stretching.

The stretching method may be a known method. The stretching temperature is generally 50 to 120° C. and the draw ratio in a longitudinal direction is 1.1 to 6.5 times, preferably 1.5 to 6.0 times, more preferably 2.5 to 5.0 times. When biaxial stretching is carried out, the draw ratio in a transverse direction is 1.1 to 6.5 times, preferably 2.5 to 6.0 times, more preferably 2.8 to 5.2 times. The film may be stretched in both longitudinal and transverse directions simultaneously. After the film is stretched in longitudinal and transverse directions, it may be further stretched in longitudinal and transverse directions.

After stretching, the film is preferably heat set. The film obtained by stretching is preferably heat set at 125 to 180° C., preferably 130 to 175° C. for 1 to 100 seconds.

According to the present invention, as described above, there is also provided a laminated polyester film comprising the aromatic polyester film of the present invention and another polyester layer formed on at least one side of the aromatic polyester film.

The another polyester layer of the laminated film is formed from a copolymer which satisfies the following expressions (1) to (5):

$$40 \leq NDA+TA < 100 \quad (1)$$

$$0 < SD \leq 5 \quad (2)$$

$$0 \leq OD \leq 60 \quad (3)$$

$$40 \leq EG+TMG \leq 100 \quad (4)$$

$$0 \leq BPAO \leq 60 \quad (5)$$

wherein NDA, TA, SD and OD are mol % of 2,6-naphthalenedicarboxylic acid, terephthalic acid, aromatic dicarboxylic acid having a sulfonate salt group and another aromatic dicarboxylic acid based on the total of all the dicarboxylic acid components, respectively, and EG, TMG and BPAO are molt of ethylene glycol, tetramethylene glycol and a bisphenol A adduct with a lower alkylene oxide based on the total of all the diol components, respectively.

The above copolymer comprises 2,6-naphthalenedicarboxylic acid (NDA) and terephthalic acid (TA) in a total amount of 40 mol % or more and less than 10 mol % (formula (1)), an aromatic dicarboxylic acid having a sulfonate salt group in an amount of more than 0 mol % and 5 mol % or less (formula (2)), and an aromatic dicarboxylic acid other than the above dicarboxylic acid in an amount of 0 mol % or more and 60 mol % or less (formula (3)) as acid components constituting the copolymer, and ethylene glycol (EG) and tetramethylene glycol (TMG) in a total amount of 40 mol % or more and 100 mol % or less (formula (4)) and a bisphenol A adduct with a lower alkylene oxide (BPAO) in an amount of 0 mol % or more and 60 mol % or less (formula (5)) as glycol components.

Out of the acid components, 2,6-naphthalenedicarboxylic acid and terephthalic acid may be mixed together or used alone. When 2,6-naphthalenedicarboxylic acid is used alone and the amount of 2,6-naphthalenedicarboxylic acid is smaller than 40 mol %, the anti-block properties of the obtained film lower disadvantageously. When the amount is larger than 90 mol % and the polyester is to be dispersed in water to prepare a coating, the dissolution of the polyester in a hydrophilic organic solvent becomes difficult, thereby making it difficult to disperse it in water. In this case, the copolymerization of a glycol component is effective in improving non-crystallinity. However, when the amount of 2,6-naphthalenedicarboxylic acid is 100 mol %, even if glycol components are copolymerized, the obtained polyester does not dissolve in a hydrophilic organic solvent any longer.

The amounts of 2,6-naphthalenedicarboxylic acid (NDA) and terephthalic acid (TA) as components to be copolymerized are preferably selected to satisfy requirements for a laminated film and to ensure that adhesion and anti-block properties required for a final product and affinity with an aromatic polyester film to be coated become satisfactory.

For example, when the laminated polyester film is a double-layer film consisting of a poly(trimethylene 2,6-naphthalene dicarboxylate) layer and a copolyester layer, the amounts must be selected to ensure that adhesion, anti-block properties and affinity between poly(trimethylene-2,6-naphthalene dicarboxylate) and the copolymer become satisfactory.

The total amount of 2,6-naphthalenedicarboxylic acid and terephthalic acid is preferably 40 to 98 mol %, more preferably 40 to 95 mol %. The amount of 2,6-naphthalenedicarboxylic acid is preferably 98 mol % or less. The amount of terephthalic acid is preferably 70 to 99 mol %, more preferably 80 to 98 mol %.

The copolymer which does not satisfy the above conditions is unsatisfactory in terms of adhesion and anti-block properties.

When the amount of the aromatic dicarboxylic acid (SD) having a sulfonate salt group is 0 mol %, the hydrophilic nature of the obtained copolymer lowers, thereby making it difficult to disperse it in water. When the amount is larger than 5 mol %, the anti-block properties of the obtained film lower disadvantageously. The amount of the aromatic dicarboxylic acid (SD) having a sulfonate salt group is referably 0.001 to 4.7 mol %, more preferably 0.05 to 4.5 mol %.

Preferred examples of the aromatic dicarboxylic acid (SD) having a sulfonate salt group include 5-sodium sulfoisophthalic acid, 5-potassium sulfoisophthalic acid, 5-lithium sulfoisophthalic acid, 5-phosphonium sulfoisophthalic acid and the like.

The acid components of the above copolymer in the present invention include 2,6-naphthalenedicarboxylic acid and an aromatic dicarboxylic acid having a sulfonate salt group in the above amounts. Another aromatic dicarboxylic acid other than the above aromatic dicarboxylic acid, such as isophthalic acid, phthalic acid, bisphenyldicarboxylic acid or lower alkyl ester thereof may be used in combination with these. Out of these aromatic dicarboxylic acids, isophthalic acid and methyl esters thereof are particularly preferred.

Further, the amount of the another aromatic dicarboxylic acid based on the total of all the acid components of the copolymer in the present invention is selected according to the required physical properties of a film.

The total amount of ethylene glycol (EG) and tetramethylene glycol (TMG) out of the glycol components of the above copolymer in the present invention is preferably 40 to 100 mol % and the amount of the bisphenol A adduct with a lower alkylene oxide (BPEO) is 0 to 60 mol %.

When the total amount of ethylene glycol (EG) and tetramethylene glycol (TMG) is smaller than 40 mol %, the adhesion and anti-block properties of the obtained film lower disadvantageously. The total amount is more preferably 50 to 90 mol %.

The amount of ethylene glycol (EG) is preferably 60 to 95 mol %, more preferably 70 to 90 mol %.

The amount of tetramethylene glycol (TMG) is preferably 60 to 95 mol %, more preferably 70 to 90 mol %.

The bisphenol A adduct with a lower alkylene oxide (BPAO) and ethylene glycol must be used in combination as the glycol components of the above copolymer.

The bisphenol A adduct with a lower alkylene oxide (BPAO) is a compound represented by the following formula:

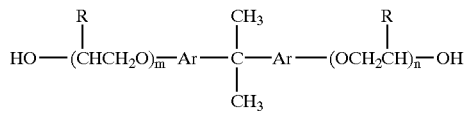

wherein R is a hydrogen atom or lower alkyl group having 1 to 5 carbon atoms, Ar is a phenylene group or group obtained by substituting at least one of four hydrogen atoms on a ring with a lower alkyl, and m and n are natural numbers with the proviso that m+n is 2 to 10.

The use of this compound is effective in improving the water dispersibility of the obtained copolymer.

In the above formula, examples of the lower alkyl represented by R include methyl, ethyl, propyl, butyl, pentyl and the like, out of which methyl is particularly preferred. Examples of the lower alkyl substituent for the hydrogen on the ring of Ar include methyl, ethyl, propyl, butyl, pentyl and the like, out of which methyl is particularly preferred. Ar is preferably a phenylene group or monomethyl-substituted phenylene group, out of which a phenylene group is particularly preferred.

Examples of the bisphenol A adduct with a lower alkylene oxide (BPAO) include bisphenol A adducts with ethylene oxide, propylene oxide, butadiene oxide and the like. Bisphenol A adducts with ethylene oxide and propylene oxide are particularly preferred. When m+n is large, the anti-block properties of the polymer lower. m+n is preferably 10 or less, more preferably 8 or less, the most preferably 4.

The glycol components of the copolymer include ethylene glycol and the bisphenol A adduct with a lower alkylene oxide in the above amounts. Another aliphatic or alicyclic glycol other than these may further be used in an amount of less than 10 mol %. Preferred examples of the another aliphatic or alicyclic glycol include 1,4-butanediol, 1,4-cyclohexane dimethanol and the like.

The intrinsic viscosity of the above copolymer is preferably 0.4 to 0.8, more preferably 0.5 to 0.7. The intrinsic viscosity is measured in o-chlorophenol at 35° C.

The method of producing the copolymer in the present invention may be any conventionally known method or method which has been accumulated by the industry and is capable of producing the copolymer efficiently.

A preferred production method is to carry out an ester exchange reaction between an ester derivative of 2,6-naphthalenedicarboxylic acid and an aliphatic glycol by heating in the presence of an ester exchange catalyst and a polycondensation reaction in the presence of a polycondensation catalyst.

Specifically, 2,6-naphthalenedicarboxylic acid or ester forming derivative thereof, isophthalic acid or ester forming derivative thereof, and 5-sodium sulfoisophthalic acid or ester forming derivative thereof are reacted with ethylene glycol and a bisphenol adduct with propylene oxide to form a monomer or oligomer which is then polycondensed under vacuum to produce a copolymer having a predetermined intrinsic viscosity. At this point, catalysts for promoting the reactions, such as an esterification catalyst, ester exchange catalyst and polycondensation catalyst, and various stabilizers and additives may be added.

In the present invention, any conventionally known method or method which has been accumulated by the industry and is capable of producing the copolymer efficiently may be used without restriction to laminate a copolymer constituting at least one surface layer.

For example, the copolymer constituting at least one surface layer is dispersed in water or an organic solvent and the resulting dispersion is coated on the aromatic polyester film of the present invention to form a laminated film.

Particularly when a polyester water dispersion is to be coated on the aromatic polyester film of the present invention, the coating solution may be produced by the following method, for example.

Preferably, the copolymer has a solubility in 1 liter of water at 20° C. of 20 g or more and a boiling point of 100° C. or less and dissolves in a hydrophilic organic solvent which boils together with water at 100° C. or less. Examples of the organic solvent include dioxane, acetone, tetrahydrofuran, methyl ethyl ketone and the like. A small amount of a surfactant such as dodecylbenzenesulfonic acid may be added to the solution. The copolymer is dissolved in a hydrophilic organic solvent, water is added to the solution under agitation, preferably high-speed agitation by heating to prepare a blue white or semitranslucent dispersion. A blue white or semitranslucent dispersion may also be prepared by adding the organic solution to water under agitation.

When the hydrophilic organic solvent is distilled off from the obtained dispersion at normal pressure or reduced pressure, the copolymer water dispersion of interest is obtained. When the copolymer is dissolved in a hydrophilic organic solvent which boils together with water, the copolymer is preferably dispersed in a slightly large amount of water in consideration of a reduction in the amount of water (co-boiling part) because water co-boils at the time of distilling off the organic solvent.

Further, when the solid content after distillation is higher than 40 wt %, the re-agglomeration of copolyester fine particles dispersed in water readily occurs and the stability of the water dispersion lowers. Therefore, the solid content after distillation is preferably set to 40wt % or less. There is no lower limit to solid content but when the solid content is too low, the time required for drying becomes too long. Therefore, the solid content is preferably 0.1 wt % or more, more preferably 5 wt % or more and 30 wt % or less.

The average particle diameter of the copolymer fine particles is generally 1 $\mu$m or less, preferably 0.8 $\mu$m or less.

The thus obtained water dispersion of the copolymer constituting at least one surface layer is coated on one side or both sides of the aromatic polyester film of the present invention and dried to provide useful characteristic properties to the film.

The above dispersion may contain a surfactant such as an anionic surfactant or nonionic surfactant as required at the time of coating. The effective surfactant can reduce the surface tension of the polyester to 40 dyne/cm or less and promote the wetting of the polyester film. Most of known surfactants may be used. Examples of the surfactant include polyoxyethylene alkyl phenyl ethers, polyoxyethylene fatty acid esters, sorbitan fatty acid esters, glycerin fatty acid esters, fatty acid metal soap, alkyl sulfuric acid salts, alkyl sulfonic acid salts, alkyl sulfosuccinic acid salts, quaternary ammonium chloride, alkylamine hydrochlorides, sodium dodecylbenzene sulfonates and the like.

The copolymer water dispersion may contain an antistatic agent, filler, ultraviolet absorber, lubricant, colorant and the like as required.

Any conventionally known method or method which has been accumulated by the industry and is capable of producing a film efficiently may be used without restriction to produce the laminated polyester film of the present invention.

The laminated polyester film of the present invention may be any one of an unstretched film, uniaxially oriented film and biaxially oriented film, out of which a biaxially oriented film is preferred.

A description is specifically given of a laminated film consisting of two layers.

The step of coating the above copolymer water dispersion on the aromatic polyester film of the present invention can be optionally selected. The copolymer water dispersion is coated on the unstretched film or uniaxially oriented film of the aromatic polyester of the present invention, dried by heating and further stretched, or is coated on the biaxially oriented film of the aromatic polyester of the present invention and dried. Out of these, the dispersion is preferably coated on the uniaxially oriented film.

Coating may be carried out by a commonly used method such as kiss coating, reverse coating, gravure coating, die coating or the like. The amount of coating is preferably 0.01 to 5 μm (dry), more preferably 0.01 to 2 μm (dry), the most preferably 0.01 to 0.3 μm (dry) as the final thickness.

The laminated polyester film of the present invention preferably has a total of Young's moduli in longitudinal and transverse directions of 400 kg/mm² or more when it is a biaxially oriented film. When the total of Young's moduli is below the above range, the strength of the obtained film becomes insufficient disadvantageously. A film having a total of Young's moduli in both longitudinal and transverse directions of more than 700 kg/mm² is inferior in delamination resistance. The total of Young's moduli is more preferably 450 to 650 kg/mm².

Since the thus obtained laminated polyester film has excellent gas barrier properties and high adhesive force as well as excellent heat resistance, water resistance and antiblock properties, it is useful as a food packing material, printing material, graphic material, photosensitive material or the like.

Out of aromatic polyesters constituting the above aromatic polyester film of the present invention, an aromatic polyester comprising 2,6-naphthalenedicarboxylic acid as the main dicarboxylic acid component, 1,3-propanediol as the main diol component and a sulfonic acid quaternary phosphonium salt having an ester forming functional group in an amount of 0.1 to 45 mmol % based on the total of all the dicarboxylic acid components is novel and provided by the present invention.

The above aromatic polyester can be a copolymer whose main dicarboxylic acid component is substantially 2,6-naphthalenedicarboxylic acid and whose main diol component is substantially 1,3-propanediol and which comprises, as a copolymerized composition, at least one compound selected from dicarboxylic acids other than 2,6-naphthalenedicarboxylic acid and diols other than 1,3-propanediol in an amount of 30 mol % or less based on the total of all the dicarboxylic acid components. The other dicarboxylic acids and the other diols have already been listed above. It should be understood that the above description is applied to what is not described of this aromatic polyester herein.

The quaternary phosphonium salt having an ester forming functional group is preferably a compound represented by the following formula:

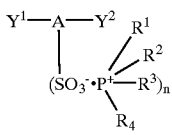

wherein A is a group having an aromatic ring with 6 to 18 carbon atoms, $Y^1$ and $Y^2$ are the same or different and each a hydrogen atom or ester forming functional group ($Y^1$ and $Y^2$ cannot be a hydrogen atom at the same time), n is 1 or 2, and $R^1$, $R^2$, $R^3$ and $R^4$ are the same or different and each an alkyl group having 1 to 18 carbon atoms, benzyl group or aryl group having 6 to 12 carbon atoms.

In the above formula, A is a group having an aromatic ring with 6 to 18 carbon atoms, preferably a group having a benzene skeleton, naphthalene skeleton or biphenyl skeleton. The aromatic ring may be substituted by an alkyl group having 1 to 12 carbon atoms in addition to $Y^1$, $Y^2$ and a sulfonic acid quaternary phosphonium base. $Y^1$ and $Y^2$ are a hydrogen atom or ester forming functional group such as —COOH, —COOR', —OCOR', —(CH$_2$)$_n$OH and —(OCH$_2$)$_n$OH. In these groups, R' is a lower alkyl group having 1 to 4 carbon atoms or phenyl group, and n is an integer of 1 to 10. Preferred examples of R' include methyl, ethyl, n-propyl, iso-propyl, n-butyl and the like. $R^1$, $R^2$, $R^3$ and $R^4$ constituting the sulfonic acid quaternary phosphonium base are the same or different. Examples of the alkyl group having 1 to 18 carbon atoms include methyl, ethyl, propyl, butyl, dodecyl, steryl and the like. Examples of the aryl group having 6 to 12 carbon atoms include phenyl, naphthyl, biphenyl and the like.

Preferred examples of the above sulfonic acid quaternary phosphonium salt include tetrabutylphosphonium 3,5-dicarboxybenzene sulfonate, ethyltributylphosphonium 3,5-dicarboxybenzene sulfonate, behzyltributylphosphonium 3,5-dicarboxybenzene sulfonate, phenyltributylphosphonium 3,5-dicarboxybenzene sulfonate, tetraphenylphosphonium 3,5-dicarboxybenzene sulfonate, butyltriphenylphosphonium 3,5-dicarboxybenzene sulfonate, tetrabutylphosphonium 3,5-dicarbomethoxybenzene sulfonate, ethyltributylphosphonium 3,5-dicarbomethoxybenzene sulfonate, benzyltributylphosphonium 3,5-dicarbomethoxybenzene sulfonate, phenyltributylphosphonium 3,5-dicarbomethoxybenzene sulfonate, tetrabutylphosphonium 3,5-di(β-hydroxyethoxycarbonyl)benzene sulfonate, tetraphenylphosphonium 3,5-di(β-hydroxyethoxycarbonyl)benzene sulfonate, tetrabutylphosphonium 3-dicarboxybenzene sulfonate, tetraphenylphosphonium 3-dicarboxybenzene sulfonate, tetrabutylphosphonium 3-di(β-hydroxyethoxycarbonyl)benzene sulfonate tetraphenylphosphonium 3-di(β-hydroxyethoxycarbonyl)benzene sulfonate, tetrabutylphosphonium 4-di(β-hydroxyethoxycarbonyl)benzene sulfonate, bisphenol A-3,3-di(tetrabutylphosphonium sulfonate), tetrabutylphosphonium 2,6-dicarboxynaphthalene-4-sulfonate and the like. The above sulfonic acid quaternary phosphonium salts may be used alone or in combination of two or more.

In the present invention, the sulfonic acid quaternary phosphonium salt is contained in an amount of 0.1 to 45 mmol % based on the total of all the dicarboxylic acids, shows an AC volume resistivity of $2.0 \times 10^8$ Ωcm or less when the polyester is molten, can provide a sufficient amount of charge for sticking the polyester to a cooling drum which rotates relatively fast and can improve the film forming speed which is one of the objects of the present invention. The above aromatic polyester of the present invention can be produced by any known method.

To copolymerize the above sulfonic acid quaternary phosphonium salt with the aromatic polyester, it may be added to a reaction system in any stage before the synthesis of the aromatic polyester is completed, or may be fed to a vented double-screw kneading extruder together with the aromatic polyester to be melt kneaded after the synthesis of the aromatic polyester is completed.

The sulfonic acid quaternary phosphonium salt which is detected after 2 hours of immersion in a 50% ethanol solution at 250° F. (121° C.) is preferably contained in the aromatic polyester of the present invention in an amount of 1 ppm or less. When the amount of the detected sulfonic acid quaternary phosphonium salt is more than 1 ppm, the obtained film is not preferred as a food packing material. To adjust the amount of the detected sulfonic acid quaternary phosphonium salt to 1 ppm or less, the sulfonic acid quaternary phosphonium salt may be added in the stage of synthesizing the polyester or at least 3 minutes after the synthesis of the polyester to ensure that the temperature in the reaction system becomes 240° C. or more, when the polyester is prepared.

The above aromatic polyester of the present invention may contain an antimony compound in an amount of 70 to 400 ppm in terms of antimony atoms, a titanium compound in an amount of 15 to 300 ppm in terms of titanium atoms and a germanium compound in an amount of 30 to 400 ppm in terms of germanium atoms.

The above metal compounds are used as polymerization catalysts for the aromatic polyester.

The antimony compound used as a polymerization catalyst is not particularly limited and any Sb compound having polymerization catalytic activity may be used. Examples of the antimony compound include oxides such as antimony trioxide, antimony tetraoxide and antimony pentoxide, halides such as antimony trichloride and antimony tribromide, acid salts such as antimony acetate, alcoholates such as antimony glycolate, and the like. Out of which, oxides are preferred and antimony trioxide is particularly preferred.

The antimony compound is contained in an amount of preferably 70 to 400 ppm, particularly preferably 100 to 350 ppm in terms of antimony atoms. When the amount of antimony is smaller than 70 ppm, sufficient polymerization activity cannot be obtained, which is not preferred for the production of a polyester. When the amount of antimony is larger than 400 ppm, the obtained polyester becomes blackish and the antimony catalyst residue is contained in the polyester as foreign matter.

The titanium compound used as a polymerization catalyst is not particularly limited and any titanium compound having polymerization catalytic activity may be used. Examples of the titanium compound include titanium tetrabutoxide, titanium tetrapropoxide, titanium tetraethoxide, titanium isopropoxyoctylene glycol, titanium butoxyoctylene glycol and reaction mixtures of these and acid anhydrides. Out of these, titanium tetrabutoxide or a reaction product of it and an acid anhydride is particularly preferred from the viewpoints of polymerization activity and cost.

The titanium compound is contained in an amount of preferably 15 to 300 ppm, particularly preferably 20 to 100 ppm in terms of titanium atoms. When the amount of titanium is smaller than 15 ppm, sufficient polymerization activity cannot be obtained, which is not preferred for the production of a polyester. When the amount of titanium is larger than 300 ppm, the obtained polyester becomes yellowish and deteriorates in heat resistance disadvantageously.

The germanium compound used as a polymerization catalyst is not particularly limited and any germanium compound having polymerization catalytic activity may be used. Germanium dioxide is preferred as the germanium compound. So-called amorphous germanium having no crystal form is particularly preferred because it can reduce the number of particles which separate out in the polymer.

The amount of the germanium compound added is preferably such that the amount of a germanium compound contained in the produced polyester should be 30 to 400 ppm, particularly preferably 40 to 350 ppm in terms of germanium atoms. When the amount of germanium contained in the polyester is smaller than 30 ppm, sufficient polymerization activity cannot be obtained and it may be difficult to produce the polyester. When the amount of germanium contained in the polyester is larger than 400 ppm, the color of the obtained polyester may worsen or the heat resistance thereof may lower.

The aromatic polyester of the present invention preferably contains no more than 50 foreign substances of 10 $\mu$m or more in size per 1 g of the aromatic polyester. The number of foreign substances per 1 g of the aromatic polyester is more preferably 30 or less, particularly preferably 10 or less. When the number of foreign substances of 10 $\mu$m or more in size is larger than 50 and, for example, a biaxially oriented film is formed from the aromatic polyester containing these foreign substances, portions around the foreign substances are stretched, thereby forming voids around the foreign substances with a high probability of producing large film surface defects. To reduce the number of foreign substances of 10 $\mu$m or more in size to 50 or less, the amount of metallic Sb derived from the Sb compound catalyst remaining in the polyester must be reduced to 70 to 400 ppm.

The L value and b value measured by an Lab method of the above aromatic polyester of the present invention preferably satisfy the following expressions (6) and (7):

$$65 \leq L-b \quad (6)$$

$$b \leq 10 \quad (7)$$

wherein L and b are L and b values measured by a color difference meter.

The value L–b is more preferably 70 or more. The b value is preferably 8 or less, more preferably 6 or less. The greater the L value, the more the whiteness improves. The greater the b value, the more the yellow tint increases. When the polyester does not satisfy the above expressions, the film becomes yellowish by heat history at the time of forming a film by melt extrusion. Therefore, when it is used as a packing film, its color becomes worse and cuts down consumers' purchase desire. Means of controlling the color of the polyester to satisfy the above expressions is not particularly limited. The above expressions can be satisfied, for example, by suitably controlling the amount of titanium atoms derived from the titanium compound remaining in the polyester to 15 to 300 ppm, polymerization temperature and polymerization time.

According to the present invention, there is provided a polyester composition comprising the above aromatic polyester of the present invention and another aromatic polyester. That is, the polyester composition provided by the present invention comprises the aromatic polyester of the present invention in an amount of 60 wt % or more and another aromatic polyester in an amount of 40 wt % or less based on the total of the aromatic polyester of the present invention and the another aromatic polyester.

Examples of the another aromatic polyester include polyethylene terephthalate, polyethylene-2,6-naphthalene dicarboxylate, polytetramethylene terephthalate, polytetramethylene-2,6-naphthalene dicarboxylate, polyhexamethylene terephthalate, polyhexamethylene-2,6-naphthalene dicarboxylate and copolymers thereof. These another aromatic polyesters may be used alone or in combination of two or more. When the amount of the another aromatic polyester is larger than 40 wt %, the obtained composition has low light resistance and the obtained film has low transparency. The amount of the another aromatic polyester is preferably 35 wt % or less, more preferably 30 wt % or less.

The above polyester composition of the present invention preferably has an intrinsic viscosity measured at 35° C. in a mixed solvent of phenol/tetrachloroethane (weight ratio of 6:4) of 0.4 to 1.5. When the intrinsic viscosity is lower than 0.4, the obtained film is unsatisfactory in terms of mechanical properties and when the intrinsic viscosity is higher than 1.5, moldability stretchability becomes insufficient disadvantageously. The intrinsic viscosity is preferably in the range of 0.45 to 1.3, more preferably 0.5 to 1.1.

The polyester composition of the present invention may contain such additives as a lubricant, pigment, dye, antioxidant, light stabilizer, heat stabilizer, light screen, delustering agent and the like as required. A lubricant is particularly effective in providing slipperiness at the time of forming a film.

The method of blending the aromatic polyester of the present invention and another aromatic polyester to produce the polyester composition of the present invention is not particularly limited. Preferred examples of the method include one which the another aromatic polyester is added before the completion of the polymerization reaction of the aromatic polyester of the present invention and the resulting mixture is chipped, one in which the aromatic polyester of the present invention and another aromatic polyester are kneaded together with a melt kneader such as a single-axis or double-axis kneader and chipped, and one in which they are melt kneaded together at the time of forming a film and formed into a film directly. When the melt kneader is used, blended chips may be melt kneaded, or two or more of the above polymers may be supplied into a kneader equipped with a quantitative feeder quantitatively to be melt kneaded together.

Finally, according to the present invention, there is provided an antifungal polyester composition comprising either one of the aromatic polyester of the present invention and the aromatic polyester composition of the present invention and an inorganic anti-fungus agent in an amount of 0.1 to 10 wt % based on the aromatic polyester of the present invention or the aromatic polyester composition of the present invention.

The average particle diameter of the inorganic anti-fungus agent is preferably 0.2 to 7 $\mu$m, more preferably 0.4 to 5 $\mu$m. The content of the inorganic anti-fungus agent is preferably 0.2 to 7 wt %, more preferably 0.3 to 5 wt %.

An anti-fungus agent which is relatively inexpensive, nontoxic or almost nontoxic, has a high antifungal effect, is insoluble or hardly soluble in water or an organic solvent and does not cause an environmental pollution problem is preferred as the anti-fungus agent.

The average particle diameter is calculated from the following equation by depositing a metal on the surface of each particle and obtaining an area circle equivalent diameter from an image magnified 10,000 to 30,000 times by an electron microscope.

average particle diameter=total of area circle equivalent diameters of measured particles/number of measured particles When the average particle diameter is smaller than 0.1 $\mu$m, the agglomeration of particles occurs, thereby preventing the formation of a film, and when the average particle diameter is larger than 10 $\mu$m, pin holes are formed or the film is broken in some cases.

When the amount of the anti-fungus agent is smaller than 0.1 wt %, antifungal properties are not developed and when the amount of the anti-fungus agent is larger than 10 wt %, the polyester film becomes cloudy and not transparent.

To further improve the dispersibility and affinity of the anti-fungus agent with the polyester to achieve transparency, an anti-fungus agent whose surface is treated with an anionic surfactant, aluminum- or titanium-based coupling agent or fatty acid ester of a polyhydric alcohol by a commonly used method may be used.

To contain the anti-fungus agent in the above polyester, various methods may be used. Typical methods are given below.

(a) An anti-fungus agent is added before the completion of an ester exchange or esterification reaction at the time of synthesizing a polyester or before a polycondensation reaction.

(b) An anti-fungus agent is added to a polyester and melt kneaded with the polyester.

(c) A master batch containing an anti-fungus agent in a high concentration is prepared and added to contain a predetermined amount of the anti-fungus agent in the polyester in the above methods (a) and (b). Out of these, the method (a) is the most preferred.

Inorganic anti-fungus agents include inorganic compounds (such as zeolite, zirconium phosphate, montmorillonite, hydroxyapatite, phosphoric acid complex salts, tripolyphosphates, magnesium aluminosilicate, calcium silicate, titanium oxide, silica gel, melting glass and the like) carrying metal ions (such as silver, copper, zinc, tin, lead, bismuth, cadmium, chromium, mercury and the like) and/or complex ions thereof (such as silver thiosulfate ions and the like), and composite metal oxides containing at least two metal elements (such as zinc, copper, magnesium, calcium and the like). Out of these, inorganic compounds carrying a silver ion as a metal ion and/or composite metal oxides are particularly preferred because they have antifungal properties and rarely causes environmental pollution.

An anti-fungus agent containing a composite metal oxide as an effective ingredient is preferably an oxide solid solution represented by the following formula:

$$[(A_1)_x(A_2)_{1-x}]O$$

wherein $A_1$ is a divalent metal selected from Zn and/or Cu, $A_2$ is also a divalent metal selected from Mg and/or Ca, and X is an number which satisfies $0.01 \leq X < 0.5$.

When a metal other than those is used, the obtained anti-fungus agent deteriorates in antifungal properties and environmental pollution disadvantageously. When the proportion of $A_1$ in the formula is smaller than. 0.01, sufficient antifungal properties cannot be obtained and when the proportion of $A_1$ is 0.5 or more, it foams disadvantageously at the time of adding it to the polyester resin.

The polyester resin composition of the present invention is advantageously formed into a film, particularly a packing film. The total haze of the obtained film is preferably 0.1 to 20%.

When the total haze is smaller than 0.1%, the film loses appropriate friction and workability, thereby reducing productivity. When the total haze is larger than 20%, the film loses transparency and shows no design when the back of the film is printed.

The total haze of the film is measured in accordance with JIS-K7105 and obtained from the following expression:

$$\text{total haze } (\%) = (Td/Tt) \times 100$$

wherein Td is a diffuse transmission (%) and Tt is a total light transmission (%).

To provide appropriate friction and workability to a film, inert fine particles are preferably contained in the anti-fungus agent in limits that satisfy the above range. Examples of the inert fine particles include fine particles containing the IIA, IIB, IVA and IVB elements of the periodic table (such as kaolin, alumina, titanium oxide, calcium carbonate and silicon dioxide), and polymer fine particles having high heat resistance such as silicone resin and crosslinked polystyrene.

The average particle diameter of the inert fine particles is preferably in the range of 0.01 to 5.0 $\mu$m, more preferably 0.1 to 3.0 $\mu$m.

The amount of the inert fine particles is preferably in the range of 0.001 to 2.0 wt %, more preferably 0.01 to 1.0 wt %.

EXAMPLES

The following examples are provided for the purpose of further illustrating the present invention but are in no way to be taken as limiting without departing from the scope of the present invention. The measurement methods and definitions of physical properties and characteristic properties in. the examples are as follows. "Parts" means "parts by weight" unless otherwise stated.

(1) Density

Measured in a gradient density tube filled with a calcium nitrate aqueous solution as a solvent at 25° C. by sink-float density determination. The unit is $g/cm^3$.

(2) Intrinsic Viscosity

Measured in a mixed solvent of phenol/tetrachloroethane (weight ratio of 6:4) at 35° C. The unit is dl/g.

(3) Oxygen Permeability

The oxygen permeability of a film is obtained by a commercially available gas permeability measuring instrument (GTR Tester M-C1 of Toyo Seiki Seisakusho Co., Ltd.) in. accordance with an ASTM D-1434-75M method. A pressure difference is made between both sides of the film and oxygen permeability is calculated from the gradient of a time change in pressure at 25° C. to obtain oxygen permeability per unit thickness. The unit is $cc \cdot cm/cm^2 \cdot sec \cdot cmHg$.

(4) Young's Moduli

The film is cut to a width of 10 mm and a length of 15 cm and the obtained sample is pulled by an Instron type universal tensile tester at a chuck interval of 100 mm, a pull rate of 10 mm/min and a chart rate of 500 mm/min. Young's moduli are calculated from the tangent of a rising portion of the obtained load-elongation curve. The unit is $kg/mm^2$.

(5) Plane Orientation Coefficient (ns)

The refractive indices nMD, nTD and nZ in longitudinal (MD), transverse (TD) and film thickness directions (Z) on the film plane are obtained using an Na-D ray at 25° C. with an Abbe's refractometer (of Atago Co., Ltd.) to calculate the plane orientation coefficient from the following equation (1).

$$ns=((nMD+nTD)/2)-nZ \tag{1}$$

(6) Film Haze

Measured with the POIC haze meter SET-HS-D1 of Nihonn Seimitsu Kogyo Co., Ltd.

(7) Elongation Retention After Light Resistance Test

The stretched film is cut to a size of 200×15 mm and this sample is exposed to light at a temperature of 60° C. and a humidity of 50% for 100 hours without rain with a sunshine weatherometer (of Suga Shikenki Co., Ltd.). The breaking elongations of the film before and after the exposure is measured with an autographic tensile tester to calculate elongation retention.

(8) Ultraviolet Transmission

The transmission of ultraviolet light having a wavelength of 360 nm is measured with a spectrophotometer (UV160 of Shimadzu Corporation).

(9) AC Volume Resistivity of Molten Polymer

A container containing a polymer to be measured and a pair of electrodes inserted into the polymer is immersed in a heating medium to heat the polymer at a temperature of 285° C. to melt it and that temperature is maintained. A voltage of 100 V-50 Hz is applied from an AC power source connected from the outside to the electrodes inserted into the polymer. The AC volume resistivity is obtained from values indicated by an ammeter and a voltmeter at this point, the area of electrodes and the distance between the electrodes.

(10) Electrostatic Casting Properties

The maximum speed of the cooling drum at which a film can be formed stably without producing any surface defect and reducing uniformity in thickness when the polymer is cast by applying a voltage of 6 KV between the cooling drum and electrodes through the electrodes installed above the extruded film near a nozzle from which the polymer is melt extruded into the form of a film is obtained. The electrostatic casting properties are ranked and evaluated according to the maximum speed of the cooling drum as follows.

Rank A: Film formation can be carried out stably at a cooling drum speed of 70 m/min or more.

Rank B: Film formation can be carried out stably at a cooling drum speed of 60 m/min or more and less than 70 m/min.

Rank C: Film formation can be carried out stably at a cooling drum speed of 55 m/min or more and less than 60 m/min.

Rank D: Film formation can not be carried out stably at a cooling drum speed of less than 55 m/min.

(11) Contamination of Electrostatic Wire

A reduction in the current value of an electrostatic wire caused by the contamination of the electrostatic wire is checked by extending the time of a test on the above electrostatic casting properties (10). A current value at the start of the test and a current value at the end of the test are read and the difference between them is divided by the test time to obtain a current reduction per unit time. The contamination of the electrostatic wire is ranked and evaluated according to the obtained value as follows.

Rank A: current reduction of less than 1%/hr

Rank B: current reduction of 1%/hr or more and less than 5%/hr

Rank C: current reduction of 5%/hr or more and less than 10%/hr

Rank D: current reduction of 10%/hr or more

If the contamination of the electrostatic wire is ranked A, there is no practical problem. If it is ranked B or C, the exchange frequency of the electrostatic wire is high which is disadvantageous from the viewpoint of production efficiency. If it is ranked D, the electrostatic wire cannot be applied for practical use.

(12) Adhesion of Sublimate to Extrusion Nozzle

When a sublimate is adhered to the extrusion nozzle, a molten polymer extruded from the nozzle contacts the adhered sublimate and a streak is formed on the surface of the film. The existence of this streak is observed with eyes. That is, the molten polymer is extruded from the extrusion nozzle at 285° C. and adhered to a rotary cooling drum after the passage of 8 hours to be cooled so as to obtain a substantially amorphous film, and this film is observed with eyes. When a streak is observed after the passage of 8 hours, the sublimate adhered to the extrusion nozzle must be removed. Otherwise, productivity drops.

(13) Film Surface Defect

This is for the evaluation of particulate foreign matter by-produced between the polymerization of a thermoplastic polyester and the extrusion step. The molten polymer is extruded at 285° C. and adhered to the rotary cooling drum to be cooled so as to obtain a substantially amorphous film which is then stretched to 3.6 times in a longitudinal direction and to 3.9 times in a transverse direction to produce a 15 μm thick film. This film is observed through a phase-contrast microscope to count the number of particles having a maximum length of 10 μm or more from a photomicrograph taken by the Luzex 500 image analyzer (of Nippon Regulator Co., Ltd.). If the film has a 10 or less particles per $cm^2$, it can be applied for practical use.

(14) Amount of Eluting Sulfonic Acid Quaternary Phosphonium Salt Treated with Ethanol Solution A film having a surface area on one side of 25 inch$^2$ is sampled, immersed in a 50% ethanol solution and heated in an autoclave at 250° F. (about 121° C.) for 2 hours, the obtained extract is evaporated and dried on a hot plate, methanol is added to the residue, and the resulting solution is measured by high-speed liquid chromatography (LC-10AD of Shimadzu Corporation) to determine the amount of the eluting sulfonic acid quaternary phosphonium salt.

(15) Piercing Strength

Measured in accordance with "2. strength and other test methods" of "standards for foods, additives and the like, third chapter: equipment and container packages" (Notification No. 20 of the Ministry of Health and Welfare in 1982) of the Food Sanitation Act. That is, a needle having a diameter of 1 mm and an end portion diameter of 0.5 mm is thrust into a film at a rate of 50 mm/min and the strength when the needle pierces the film is measured and taken as piercing strength. This measurement is carried out at normal temperature (25° C.) and the unit is kgf.

(16) Tear Strength (Tear Propagation Resistance)

A 12.7 mm long crack is formed at a right angle in a film sample measuring 50.8 mm (longitudinal direction)×63.5 mm (transverse direction) in a transverse direction at the center between both ends in the longitudinal direction and force required to tear the remaining length of 50.8 mm is measured with a light-load tear strength tester (of Toyo Seiki Seisakusho Co., Ltd.). This measurement is carried out in both longitudinal and transverse directions of the film and forces required in longitudinal and transverse directions are divided by the thickness of the film and taken as tear strengths in longitudinal and transverse directions, respectively. The mean value of these tear strengths in both directions is taken as the tear strength (tear propagation resistance) of the present invention. The unit is kg/mm.

(17) Breaking Strength

The film is cut to a width of 10 mm and a length of 15 cm and the obtained sample is pulled with an Instron type universal tensile tester at a chuck interval of 100 mm, a pull rate of 10 mm/min and a chart rate of 500 mm/min to obtain breaking strength. The unit is kg/mm$^2$.

(18) Moisture Permeability

The moisture permeability of a film at 40° C. and 90%RH is measured in accordance with JIS Z 0208 (in terms of a 12 μm thick film). The unit is g/m$^2$·24 hr·12 μm.

(19) Extractability with Ion Exchange Water (1) In Case of Polyester Resin Composition The polyester resin composition is hot pressed at 260° C. to prepare a 0.5 mm thick plate-like sample which is used for extraction with ion exchange water at 125° C. for 1 hour. The ion exchange water is collected to measure the weight of a nonvolatile content obtained by distilling off water.

(2) In Case of Film

The polyester film is used for extraction with ion exchange water at 125° C. for 1 hour and the ion exchange water is collected to measure the weight of a nonvolatile content obtained by distilling off water.

(20) Odor Retention Properties

A resin coated can is made by the method disclosed by JP-A 7-70341, filled with 300 ml of ion exchange water and kept at normal temperature (20° C.) for 30 days. A drink test is made on 30 panelists using the ion exchange water filled in the can to compare it with ion exchange water for comparison and evaluate it based on the following criteria.

⊚: 3 or less out of 30 panelists feel a difference in taste between them.

○: 4 to 6 out of 30 panelists feel a difference in taste between them.

Δ: 7 to 9 out of 30 panelists feel a difference in taste between them.

X: 10 or more out of 30 panelists feel a difference in taste between them.

(21) Oligomer Extraction with Chloroform (1) In Case of Polyester Resin Composition The polyester resin composition is hot pressed at 260° C. to prepare a 0.5 mm thick plate-like sample and 5 g of the sample is used for extraction with chloroform for 24 hours using a Soxhlet extractor. The weight of the polyester resin composition after drying is measured to obtain extractability from the following equation (2).

(2) In Case of Film 5 g of a 5 mm wide and 20 mm long film is used for extraction with chloroform for 24 hours using a Soxhlet extractor. The weight of the polyester resin composition after drying is measured to obtain extractability from the following equation (2).

$$\text{oligomer extractability (wt \%)} = ((\text{weight before extraction} - \text{weight after extraction})/\text{weight before extraction}) \times 100 \quad (2)$$

(22) Average Particle Diameter of Particles

The average particle diameter of particles is measured by the following methods.

(1) Particles Contained in Dispersion

The average particle diameter of inorganic Particles dispersed in water or ethylene glycol is measured using the SALD-2000 laser analyzer of Shimadzu Corporation.

(2) Particles Contained in Film

A piece of a sample film is fixed on the sample table of a scanning electron microscope and the surface of the film is ion etched with the sputtering device of Eiko Engineering Co., Ltd. (1B-2 ion coater) under the following conditions.

The sample is placed in a cylinder jar, the degree of vacuum is raised to about $5 \times 10^{-2}$ Torr and ion etching is carried out at a voltage of 0.90 KV and a current of 5 mA for about 5 minutes.

Further, the surface of the film is sputtered with gold using the above device and observed at a magnification of 20,000 to 30,000× by a scanning electron microscope to obtain the area circle equivalent average particle diameter of the particles.

(23) Properties of Inorganic Particle Dispersion

The inorganic particle dispersion is judged with eyes according to properties when water is added to inorganic particles and the degree of difficulty of quantitative supply to the double-screw kneading extruder.

○: The dispersion is a slurry in which silica powders are uniformly dispersed in water and the quantitative supply of the slurry to the double-screw kneading extruder is easy.

×: The viscosity of the inorganic particle dispersion is high and the quantitative supply to the double-screw kneading extruder is difficult.

(24) Dispersibility of Inorganic Particles in Film

A biaxially oriented film is used to measure the number of coarse particles (agglomerated particles) having a diameter of 10 μm or more per 100 cm$^2$ with an optical microscope and evaluate dispersibility based on the following criteria. The amount of the inorganic particles in the film is set to 0.06 wt % based on the polyester. criteria ○: less than 50 coarse particles Δ: 50 or more and less than 100 coarse particles ×: 100 or more coarse particles

(25) Coefficient of Static Friction

The coefficient of static friction is measured using a slip tester in accordance with ASTM-D-1894-63.

(26) Anti-block Properties

Two films are Joined together in such a manner that the treated surface of one film and the non-treated surface of the other film are contacted to each other, pressed at a pressure of 6 kg/cm$^2$ in an atmosphere of 60° C. and 80%RH for 17 hours and separated from each other. The anti-block properties are evaluated based on this peeling (g per 5 cm).

(27) Water Resistance

A leaching solution obtained by heating water at 60° C. in an amount of 2 ml per 1 cm$^2$ of surface area is collected, and a sample film is immersed in the solution, covered with a watch glass, stirred sometimes while maintained at 60° C. and left as it is for 30 minutes. The amount of a copolyester eluting into the leaching solution is measured and evaluated.

○: The amount of elute is smaller than 1% of copolyester contained in sample.

Δ: The amount of elute is 1% or more and smaller than 10% of copolyester contained in sample.

×: The amount of elute is 10% or more of copolyester contained in sample.

(28) Delamination Resistance (Fold Delamination Whitening Ratio)

A film sample measuring 80 mm×80 mm is cut out, folded into two by hand, sandwiched between a pair of flat metal plates and pressed at a predetermined pressure P1 (kg/cm$^2$G) by a press for 20 seconds. After pressing, the double folded film sample is restored to its original state by hand, sandwiched between the above metal plates and pressed at a pressure P1 (kg cm$^2$G) for 20 seconds. Thereafter, the film sample is taken out and the lengths (mm) of whitened parts which appear on the fold are measured and totaled. New film samples are used and the above measurement is made on the new film samples at respective pressures P1 of 1, 2, 3, 4, 5 and 6 (kg/cm$^2$G). The ratio (%) of the mean value of the total lengths (mm) of whitened parts at the above pressures to the total length (80 mm) of the fold is taken as fold delamination whitening ratio (%) and used as an index indicating resistance to the delamination of the film.

(29) Adhesion

The following magnetic coating is coated on a film under predetermined conditions, Scotch Tape No. 600 (of 3M Ltd.) measuring 19.4 mm in width and 8 cm in length is affixed to the coating film in such a manner that air bubbles are not contained between the film and the tape and rolled by a manual load roll specified in JIS. C2701 (1975), and a 5 cm portion of the obtained laminate is separated from the film at a right angle at a head speed of 300 mm/min using the Tensilon UM-II of Toyo Baldwin Co., Ltd. to obtain peel strength at this point. The obtained value is divided by the width of the tape and the obtained value is expressed in g/cm. When the laminate is separated at a right angle, it is taken away from the film at a chuck interval of 5 cm in such a manner that the tape is positioned on a lower side.

<Preparation of Magnetic Coating for Evaluation>

Nitrocellulose RS1/2 (flakes containing 25% of isopropanol: manufactured by Daicel Co., Ltd.) is dissolved in a lacquer thinner for coatings to prepare a 40 wt % solution, 43.9 parts of the solution, 3.25 parts of a polyester resin (Desmophen #1700: manufactured by Bayer AG.), and 26.0 parts of chromium dioxide magnetic powders, 1 part of soy bean fatty acid (Lecion P: manufactured by Riken Vitamin Co., Ltd.), 0.5 part of a cationic activator (Cation AB: manufactured by NOF Corporation) and 0.8 part of squalene (shark liver oil) as dispersants/wetting agents are injected into a ball mill. 282 parts of a mixed solution of methyl ethyl ketone/cyclohexanone/toluene (weight ratio of 3/4/3) is further added, mixed and completely powdered to prepare a mother liquor coating (45 wt %). 48 parts of an addition reaction product of trimethylol propane and toluylene diisocyanate (Colonate L: manufactured by Nippon Polyurethane Kogyo Co., Ltd.) and 6.25 parts of butyl acetate were added to 50 parts of this mother liquor to obtain a 42.7 wt % magnetic coating for evaluation in the end.

(30) Measurement of Total Amount of Metals

The total amount of metals (unit: ppm) in the polymer is measured with fluorescent X-rays (fluorescent X ray 3270 of Rigaku Denki Kogyo Co., Ltd.) in accordance with a predetermined method.

(31) Measurement of Size of Foreign Substance 1 g of chips are well washed with acetone and then with chloroform to clean their surfaces, dissolved in a solution of hexafluoroisopropanol (to be abbreviated as HFIP hereinafter)/chloroform (weight ratio of 1/1), the resulting solution is filtered with a 1 μm-mesh membrane filter, and the filtrate is observed through an optical microscope (magnification: X200) to count the number of foreign substances having a long diameter of 10 μm or more.

(32) Evaluation of Surface Defects of Biaxially Oriented Film 1 g of the obtained biaxially oriented film is observed through a polarization microscope and surface defects having a long diameter of more than 50 μm are evaluated based on the following criteria.

◎: The number of foreign substances having a long diameter of more than 50 μm is 0 per 1 g of biaxially oriented film.

○: The number of foreign substances having a long diameter of more than 50 μm is 1 to 5 per 1 g of biaxially oriented film.

Δ: The number of foreign substances having a long diameter of more than 50 μm is 6 to 10 per 1 g of biaxially oriented film.

×: The number of foreign substances having a long diameter of more than 50 μm is more than 10 per 1 g of biaxially oriented film.

(33) Color

The polymer obtained by drying in a drier by heating at 160° C. for 60 minutes is measured by the Z-1001DP colorimeter/color differential meter of Nippon Denshoku Kogyo Co., Ltd.

Example 1-1

100 parts of dimethyl naphthalene-2,6-dicarboxylate, 47 parts of 1,3-propanediol and 0.0586 part of a titanium catalyst (titanium tetrabutoxide) were mixed together to carry out an ester exchange reaction for 150 minutes by gradually elevating the temperature from 150° C. to 210° C. After the temperature was raised to 260° C., a polycondensation reaction was carried out under a high vacuum of 0.1 mmHg or less to produce polypropylene-2,6-naphthalate having an intrinsic viscosity of 0.63.

This polypropylene-2,6-naphthalate was dried at 145° C. for 4 hours, supplied to the hopper of an extruder extruded onto a rotary cooling drum having a surface temperature of 25° C. through a 1 mm slit die at a melting temperature of 280° C. and quenched to obtain an unstretched film.

This unstretched film was preheated at 75° C. and stretched to 3.6 times in a longitudinal direction between low-speed and high-speed rolls by heating with an IR heater having a surface temperature of 670° C. from 20 mm above and then supplied to a tenter to be stretched to 3.9 times in a transverse direction at 105° C. The obtained biaxially oriented film was heat set at 140° C. and relaxed by 4% in a transverse direction at a temperature of 135° C. to obtain a 12 μm thick biaxially oriented film. The physical properties of the obtained biaxially oriented film are shown in Table 1.

Example 1-2

The polypropylene-2,6-naphthalate unstretched film obtained in Example 1-1 was preheated at 75° C. and stretched to 4.0 times in a longitudinal direction between low-speed and high-speed rolls by heating with an IR heater having a surface temperature of 670° C. from 20 mm above. Thereafter, the film was supplied to a tenter to be stretched to 4.5 times in a transverse direction at 105° C. The obtained biaxially oriented film was heat set at a temperature of 140° C. and relaxed by 4% in a transverse direction at a temperature of 135° C. to obtain a 14 μm thick biaxially oriented film. The physical properties of the obtained biaxially oriented film are shown in Table 1.

Example 1-3

The polypropylene-2,6-naphthalate unstretched film obtained in Example 1-1 was sandwiched between two iron plates and heated in a gear oven at 150° C. for 10 minutes while no tensile force was applied to the film. The physical properties of the obtained thermally treated film are shown in Table 1.

Example 1-4

The polypropylene-2,6-naphthalate unstretched film obtained in Example 1-1 was sandwiched between two iron plates and heated in a gear oven at 150° C. for 120 minutes while no tensile force was applied to the film. The physical properties of the obtained heat treated film are shown in Table 1.

Comparative Example 1-1

The physical properties of the polypropylene-2,6-naphthalate unstretched film obtained in Example 1-1 were evaluated without stretching or heating and the evaluation results are shown in Table 1.

Comparative Example 1-2

Polyethylene terephthalate (PET) (intrinsic viscosity: 0.62, glass transition temperature: 79° C., melting point: 257° C. ) was dried at 170° C. for 3 hours, supplied to the hopper of an extruder, molten at a temperature of 285° C., extruded onto a rotary cooling drum having a surface temperature of 25° C. through a 1 mm slit die and quenched to obtain an unstretched film.

This PET unstretched film was preheated at 75° C. and stretched to 3.6 times in a longitudinal direction between low-speed and high-speed rolls by heating with an IR heater having a surface temperature of 670° C. from 20 mm above. The film was then supplied to a tenter to be stretched to 3.9 times in a transverse direction at 120° C. The obtained biaxially oriented film was heat set at a temperature of 205° C. and relaxed by 4% in a transverse direction at a temperature of 185° C. to obtain a 12 μm thick biaxially oriented film. The physical properties of the obtained biaxially oriented film are shown in Table 1.

TABLE 1

| | type of polyester (note 1) | form (note 2) | stretch ratios in longitudinal and transverse directions | thickness (μm) | heat treatment temperature (° C.) | heat treatment time |
|---|---|---|---|---|---|---|
| Ex.1-1 | PPN | film | 3.6 × 3.9 | 12 | 140 | 10 sec. |
| Ex.1-2 | PPN | film | 4.0 × 4.5 | 14 | 140 | 10 sec. |
| Ex.1-3 | PPN | sheet | — | 170 | 150 | 10 min. |
| Ex.1-4 | PPN | sheet | — | 163 | 150 | 120 min. |
| C.Ex.1-1 | PPN | sheet | — | 158 | — | — |
| C.Ex.1-2 | PET | film | 3.6 × 3.9 | 12 | 205 | 10 sec. |

| | physical properties of film or sheet | | | | | |
|---|---|---|---|---|---|---|
| | | oxygen | Young's moduli | | | |
| | density ($g/cm^3$) | permeability (cc · $cm/cm^2$ · sec · cmHg) | longitudinal direction ($kg/mm^2$) | transverse direction ($kg/mm^2$) | total ($kg/mm^2$) | plane orientation coefficient |
| Ex.1-1 | 1.335 | $5.5 \times 10^{-13}$ | 66 | 12 | 0.59 | 0.200 |
| Ex.1-2 | 1.335 | $4.9 \times 10^{-13}$ | 62 | 14 | 0.59 | 0.200 |
| Ex.1-3 | 1.312 | $19.5 \times 10^{-13}$ | 60 | 18 | 0.58 | — |
| Ex.1-4 | 1.345 | $11.9 \times 10^{-13}$ | 64 | 12 | 0.58 | — |
| C.Ex.1-1 | 1.308 | $23.4 \times 10^{-13}$ | 40 | 81 | 0.6 | 0.011 |
| C.Ex.1-2 | 1.392 | $21.5 \times 10^{-13}$ | 42 | 53 | 0.58 | 0.170 |

Ex.: Example
C.Ex.: Comparative Example
(note 1)
PPN: poly(1,3-propylene-2,6-naphthalate)
PET: polyethylene terephthalate
(note 2)
film: biaxially oriented film
sheet: unstretched sheet The oxygen permeabilities of polypropylene-2,6-naphthalate films and sheets of Examples 1-1 to 1-4 are below those of a PET biaxially oriented film. Therefore, it is understood that they are excellent in oxygen gas barrier properties.

DMT: dimethyl terephthalate
DMI: dimethyl isophthalate
BPA-2EO: bisphenol A adduct with 2 moles of ethylene oxide
PET resin: polyethylene terephthalate resin

TABLE 2

| | polyester components | | copolymerizable component | | | physical properties of film | | | |
|---|---|---|---|---|---|---|---|---|---|
| | NDC | PD | | charge | | intrinsic viscosity | elongation retention | ultraviolet transmission | density |
| | (parts) | (parts) | type | (parts) | (mol %) | (dl/g) | (%) | (%) | (g/cm³) |
| Ex.2-1 | 100 | 47 | — | — | — | 0.59 | 68 | 10 | 1.336 |
| Ex.2-2 | 90 | 47 | DMT | 8 | 10 | 0.61 | 65 | 12 | 1.337 |
| Ex.2-3 | 85 | 47 | DMI | 12 | 15 | 0.60 | 60 | 15 | 1.338 |
| Ex.2-4 | 100 | 46 | BPA-2EO | 6.5 | 5 | 0.62 | 56 | 13 | 1.332 |
| Ex.2-5 | 100 | 46 | HQ-2EO | 4.1 | 5 | 0.61 | 59 | 11 | 1.333 |
| C.Ex.2-1 | PET resin | | — | — | — | 0.59 | 40 | 81 | 1.360 |

Ex.: Example
C.Ex.: Comparative Example

Examples 2-1 to 2-5

Dimethyl naphthalene-2,6-dicarboxylate, 1,3-propanediol and a copolymerizable component in amounts shown in Table 2 and 0.0586 part of tetrabuthoxy titanate as a catalyst were charged into a reactor equipped with a distiller, this reaction product was subjected to an ester exchange reaction for 150 minutes under a nitrogen gas atmosphere by elevating the temperature from 150° C. to 210° C. After the end of the ester exchange reaction, this ester exchange reaction product was transferred to a reactor heated at 240° C. and equipped with a stirrer, nitrogen introduction port, vacuum port and distiller to carry out a polycondensation reaction at normal pressure for about 5 minutes, at 15 to 20 mmHg for about 30 minutes and further at 0.1 mmHg by elevating the temperature to 260° C., and the obtained reaction product was chipped in accordance with a commonly used method after a predetermined melt viscosity was reached.

The pellets of the polyester were dried at 160° C. for 4 hours, supplied to the hopper of an extruder, molten at a temperature of 250° C. and extruded onto a rotary cooling drum having a surface temperature of 40° C. through a slit die to obtain an unstretched film. The thus obtained unstretched film was preheated at 80° C., stretched to 3.0 times in a longitudinal direction between low-speed and high-speed rolls by heating at 110° C. with an IR heater and supplied to a tenter to be stretched to 3.3 times in a transverse direction at 110° C. The obtained biaxially oriented film was heat set at a temperature of 145° C. for 5 seconds to obtain a 25 μm thick polyester film. The physical properties of the obtained film are shown in Table 2.

Comparative Example 2-1

A biaxially oriented film was obtained using polyethylene terephthalate chips having an intrinsic viscosity of 0.64. The physical properties of the obtained film are shown in Table 2.

Abbreviations in Table 2 stand for the following compounds.
NDC: dimethyl 2,6-naphthalene dicarboxylate
PD: 1,3-propanediol Example 3-1

0.059 part of tetrabutyl titanate was added to a mixture of 100 parts of dimethyl 2,6-naphthalene dicarboxylate and 46.7 parts of 1,3-propanediol to carry out an ester exchange reaction for 150 minutes by gradually elevating the temperature from 150° C. to 210° C. After the end of the ester exchange reaction, a mixture of 0.036 part of tetraphenylphosphonium 3,5-dicarboxybenzene sulfonate and 0.0838 part of ethylene glycol was heated at 40° C. and added. After 0.2 part of spherical silica having an average particle diameter of 0.6 μm was added, the temperature of reaction product was elevated to 290° C. Thereafter, a polycondensation reaction was carried out under a high vacuum of 0.2 mmHg or less to obtain a polyester having an intrinsic viscosity of 0.60. This polyester had an AC volume resistivity of $6.3 \times 10^7$ Ω·cm at 285° C. Pellets of this polyester were dried at 170° C. for 3 hours, supplied to the hopper of an extruder, melt extruded to a thickness of 200 μm through a 1 mm slit die at a melting temperature of 260° C. and brought into close contact with a rotary cooling drum having a surface temperature of 20° C. using linear electrodes to be solidified. At this point, the maximum casting speed at which a cooled film could be formed stably without producing surface defects caused by an adhesion failure by gradually increasing the speed of the cooing drum was 105 m/min. Thereafter, this unstretched film was preheated at 75° C. and stretched to 3.6 times in a longitudinal direction between low-speed and high-speed rolls by heating with an IR heater having a surface temperature of 900° C. from 15 mm above, and this uniaxially stretched film was then supplied to a tenter to be stretched to 3.9 times in a transverse direction at 105° C. and heat set at 150° C. for 3 seconds to obtain a 14 μm thick biaxially oriented film. The characteristic properties of this film are shown in Table 3.

Examples 3-2 and 3-3

The procedure of Example 3-1 was repeated except that the amount of tetrabutylphosphonium 3,5-dicarboxybenzene sulfonate added was changed as shown in Table 3. The results are shown in Table 3.

Example 3-4

The procedure of Example 3-1 was repeated except that tetraphenylphosphonium 3,5-dicarboxybenzene sulfonate was used in place of tetrabutylphosphonium 3,5-dicarboxybenzene sulfonate. The results are shown in Table 3.

Example 3-5

The synthesis reaction of a polyester resin was completed and chipped without adding tetrabutylphosphonium 3,5-dicarboxybenzene sulfonate in Example 3-1. The chips were supplied to a vented double-screw kneading extruder at a rate of 20 kg/hr and tetrabutylphosphonium 3,5-dicarboxybenzene sulfonate was supplied in an amount of 10 mmol % based on the total of the chips. At this point, the procedure of Example 3-1 was repeated except that they were melt kneaded together by setting the degree of vacuum of a vent hole to 1 mmHg and the cylinder temperature to 285° C. to obtain a polyester. The results are shown in Table 3.

Thereafter, the film was supplied to a tenter to be stretched to 3.9 times in a transverse direction at 105° C. The obtained biaxially oriented film was heat set at 140° C. for 10 seconds to obtain a 15 μm thick biaxially oriented film. The physical properties of the obtained biaxially oriented film are shown in Table 4.

Example 4-2

A 15 μm thick biaxially oriented film was obtained in the same manner as in Example 4-1 except that the stretch ratio in a longitudinal direction was changed to 4.0 times and the stretch ratio in a transverse direction was changed to 4.5 times. The physical properties of the obtained biaxially oriented film are shown in Table 4.

Comparative Example 4-1

Polyethylene naphthalate (PEN) (intrinsic viscosity: 0.62, glass transition temperature: 121° C., melting point 269° C.,

TABLE 3

| | sulfonic acid quaternary phosphonium salt | | AC volume resistivity of molten polymer (Ω · cm) | electrostatic casting properties | evaluation of contamination of electrostatic wire |
|---|---|---|---|---|---|
| | type | quantity (mmol %) | | | |
| Ex.3-1 | tetrabutylphosphonium 3,5-dicarboxyvenzene sulfonate | 17 | 6.3 × 10$^7$ | A | A |
| Ex.3-2 | tetrabutylphosphonium 3,5-dicarboxyvenzene sulfonate | 1 | 1.0 × 10$^8$ | B | A |
| Ex.3-3 | tetrabutylphosphonium 3,5-dicarboxyvenzene sulfonate | 40 | 1.2 × 10$^7$ | A | A |
| Ex.3-4 | tetraphenylphosphonium 3,5-dicarboxyvenzene sulfonate | 17 | 6.0 × 10$^7$ | A | A |
| Ex.3-5 | tetrabutylphosphonium 3,5-dicarboxyvenzene sulfonate | 17 | 6.2 × 10$^7$ | A | A |

| | adhesion of foreign substances to extrusion nozzle | number of film surface defects (per 100 cm$^2$) | amount of eluting sulfonic acid quaternary phosphonium salt by ethanol treatment (ppm) | film density (g/cm$^3$) |
|---|---|---|---|---|
| Ex.3-1 | none | 4 | 0.4 | 1.336 |
| Ex.3-2 | none | 2 | below detection limit | 1.337 |
| Ex.3-3 | none | 8 | 0.7 | 1.335 |
| Ex.3-4 | none | 3 | 0.3 | 1.335 |
| Ex.3-5 | none | 5 | 0.4 | 1.336 |

Ex.: Example

Example 4-1

100 parts of dimethyl naphthalene-2,6-dicarboxylate, 47 parts of 1,3-propanediol and 0.0586 part of a titanium catalyst (titanium tetrabutoxide) were mixed together to carry out an ester exchange reaction for 150 minutes by gradually elevating the temperature from 150° C. to 210° C. After the temperature was raised to 260° C., a polycondensation reaction was carried out under a high vacuum of 0.1 mmHg or less to produce polypropylene-2,6-naphthalate having an intrinsic viscosity of 0.63. Porous silica having an average particle diameter of 2 μm was added in an amount of 0.05 wt % to this polymer as inert fine particles to provide slipperiness to a film.

This polypropylene-2,6-naphthalate was dried at 145° C. for 4 hours, supplied to an extruder, extruded onto a rotary cooling drum having a surface temperature of 25° C. through a 1 mm slit die at a melting temperature of 280° C. and quenched to obtain an unstretched film.

This unstretched film was preheated at 75° C. and stretched to 3.6 times in a longitudinal direction between low-speed and high-speed rolls by heating with an IR heater having a surface temperature of 670° C. from 20 mm above.

containing 0.05 wt % of porous silica having an average particle diameter of 2 μm) was dried at 170° C. for 3 hours, supplied to an extruder, molten at a temperature of 300° C., extruded onto a rotary cooling drum having a surface temperature of 25° C. through a 1 mm slit die and quenched to obtain an unstretched film.

Thereafter, this PEN unstretched film was preheated at 75° C. and stretched to 3.6 times in a longitudinal direction between low-speed and high-speed rolls by heating with an IR heater having a surface temperature of 670° C. from 20 mm above. Thereafter, the film was supplied to a tenter to be stretched to 3.9 times in a transverse direction at 120° C. The obtained biaxially oriented film was heat set at 205° C. for 10 seconds to obtain a 15 μm thick biaxially oriented film. The physical properties of the obtained biaxially oriented film are shown in Table 4.

Comparative Example 4-2

The physical properties of a commercially available Nylon 6 film (Emblem ON manufactured by Unitica Co., Ltd., thickness of 15 μm) were measured. The results are shown in Table 4.

TABLE 4

| | inert particles | | | stretch ratio | | physical properties of film | | | |
|---|---|---|---|---|---|---|---|---|---|
| | type of polymer | type | average particle diameter (μm) | quantity (wt %) | longitudinal direction | transverse direction | density (g/cm$^3$) | intrinsic viscosity (dl/g) | thickness (μm) | piercing strength (kgf) |
| Ex.4-1 | PPN | porous silica | 2 | 0.05 | 3.6 | 3.9 | 1.335 | 0.57 | 12.4 | 1.26 |
| Ex.4-2 | PPN | porous silica | 2 | 0.05 | 4.0 | 4.5 | 1.335 | 0.57 | 14.2 | 1.46 |
| C.Ex.4-1 | PEN | porous silica | 2 | 0.05 | 3.6 | 3.9 | 1.358 | 0.55 | 12.0 | 1.09 |
| C.Ex.4-2 | Ny6 | — | — | 0.05 | — | — | 1.179 | 0.98 | 14.9 | 1.18 |

| | physical properties of film | | | | breaking strength | | |
|---|---|---|---|---|---|---|---|
| | tear strength | | | ratio of | | | longitudinal direction + |
| | longitudinal direction (kg/mm) | transverse direction (kg/mm) | average (kg/mm) | piercing strength to tear strength | longitudinal direction (kg/mm$^2$) | transverse direction (kg/mm$^2$) | transverse direction (kg/mm$^2$) |
| Ex.4-1 | 0.13 | 0.09 | 0.11 | 11.5 | 22.9 | 27.9 | 50.8 |
| Ex.4-2 | 0.13 | 0.12 | 0.13 | 11.2 | 23.9 | 29.3 | 53.2 |
| C.Ex.4-1 | 0.35 | 0.30 | 0.33 | 3.3 | 29.6 | 30.8 | 60.4 |
| C.Ex.4-2 | 0.52 | 0.52 | 0.47 | 2.5 | 23.3 | 26.2 | 49.5 |

Ex.: Example
C.Ex.: Comparative Example
(Notes)
PPN: poly(1,3-propylene-2,6-naphthalate)
PEN: polyethylene-2,6-naphthalate
Ny6: Nylon 6

The biaxially oriented polypropylene-2,6-naphthalate films of the present invention in Examples 4-1 and 4-2 have a piercing strength/tear strength ratio of 4.0 or more and higher piercing strength than that of PEN or Nylon 6 films and much lower tear strength than that of these films. Therefore, it is understood that they are excellent in both piercing resistance and tearability.

Example 5-1

100 parts of dimethyl naphthalene-2,6-dicarboxylate, 47 parts of 1,3-propanediol and 0.0586 part of a titanium catalyst (titanium tetrabutoxide) were mixed together to carry out an ester exchange reaction for 150 minutes by gradually elevating the temperature from 150° C. to 210° C. After the temperature was raised to 260° C., a polycondensation reaction was carried out under a high vacuum of 0.1 mmHg or less to produce polypropylene-2,6-naphthalate having an intrinsic viscosity of 0.63. Porous silica having an average particle diameter of 2 μm was added in an amount of 0.05 wt % to this polymer as inert fine particles to provide slipperiness to a film.

This polypropylene-2,6-naphthalate was dried at 145° C. for 4 hours supplied to an extruder, extruded onto a rotary cooling drum having a surface temperature of 25° C. through a 1 mm slit die at a melting temperature of 280° C. and quenched to obtain an unstretched film.

This unstretched film was preheated at 75° C. and stretched to 3.0 times in a longitudinal direction between low-speed and high-speed rolls by heating with an IR heater having a surface temperature of 670° C. from 20 mm above. Thereafter, the film was supplied to a tenter to be stretched to 3.1 times in a transverse direction at 105° C. The obtained biaxially oriented film was heat set at 140° C. for 10 seconds to obtain a 12 μm thick biaxially oriented film. The physical properties of the obtained biaxially oriented film are shown in Table 5.

Example 5-2

A 12 μm thick biaxially oriented film was obtained in the same manner as in Example 5-1 except that the film was stretched to 3.4 times in a longitudinal direction and to 3.7 times in a transverse direction and heat set at 150° C. for 20 seconds. The physical properties of the obtained biaxially oriented film are shown in Table 5.

Example 5-3

The polypropylene-2,6-naphthalate unstretched film obtained in Example 5-1 was sandwiched between two iron plates and heat set in a gear oven at 160° C. for 20 minutes while no tensile force was applied to the film. The physical properties of the obtained heat set film are shown in Table 5.

Comparative Example 5-1

Polyethylene terephthalate (PET) (intrinsic viscosity: 0.62, glass transition temperature: 79° C., melting point: 257° C., containing 0.05 wt % of porous silica having an average particle diameter of 2 μm) was dried at 170° C. for 3 hours, supplied to an extruder, molten at a temperature of 285° C., extruded onto a rotary cooling drum having a surface temperature of 25° C. through a 1 mm slit die and quenched to obtain an unstretched film.

This PET unstretched film was preheated at 75° C. and stretched to 3.0 times in a longitudinal direction between low-speed and high-speed rolls by heating with an IR heater having a surface temperature of 670° C. from 20 mm above. Thereafter, the film was supplied to a tenter to be stretched to 3.1 times in a transverse direction at 120° C. The obtained biaxially oriented film was heat set at 205° C. for 10 seconds to obtain a 16.7 µm thick biaxially oriented film. The physical properties of the obtained biaxially oriented film are shown in Table 5.

Comparative Example 5-2

The physical properties of a commercially available Nylon 6 film (Emblem ON manufactured by Unitica Co., Ltd.) were measured. The results are shown in Table 5.

under a nitrogen gas atmosphere by elevating the temperature from 150° C. to 210° C. After the end of the ester exchange reaction, this ester exchange reaction product was transferred to a reactor equipped with a stirrer, nitrogen introduction port, vacuum port and distiller and heated at 240° C. to carry out a polycondensation reaction at normal pressure for about 5 minutes, at a pressure of 15 to 20 mmHg of about 30 minutes and further at 0.1 mmHg by elevating the temperature to 260° C. After a predetermined melt viscosity was reached, the reaction product was chipped by a commonly used method to obtain pellets of poly(1,3-propylene-2,6-naphthalate) having an intrinsic viscosity of 0.65.

The pellets of poly(1,3-propylene-2,6-naphthalate) were dry blended with pellets of polyethylene terephthalate having an intrinsic viscosity of 0.64 in a ratio shown in Table 6,

TABLE 5

| | | | | | | physical properties of film or sheet |
|---|---|---|---|---|---|---|
| | type of polymer | form | stretch rations (l × t)* | heat setting temperature (° C.) | heat setting time | density (g/cm$^3$) | moisture permeability (g/cm$^2$ · 24 hr 12 µm) 40° C. 90% RH |

| | type of polymer | form | stretch rations (l × t)* | heat setting temperature (° C.) | heat setting time | density (g/cm$^3$) | moisture permeability (g/cm$^2$ · 24 hr 12 µm) 40° C. 90% RH |
|---|---|---|---|---|---|---|---|
| Ex.5-1 | PPN | biaxilly oriented film | 3.0 × 3.1 | 140 | 10 sec. | 1.340 | 6.3 |
| Ex.5-2 | PPN | biaxilly oriented film | 3.4 × 3.7 | 150 | 20 sec. | 1.348 | 5.5 |
| Ex.5-3 | PPN | unstretched film | — | 160 | 20 min. | 1.317 | 26.1 |
| C.Ex.5-1 | PET | biaxilly oriented film | 3.0 × 3.1 | 205 | 10 sec. | 1.393 | 35.9 |
| C.Ex.5-2 | Ny6 | commercially available film | — | — | — | 1.179 | 187.5 |

| | physical properties of film or sheet | | | | | | |
|---|---|---|---|---|---|---|---|
| | oxygen permeability (cc · cm/cm$^2$ · sec · cmHg) | | Young's moduli (kg/mm$^2$) | | | plane orientation | haze | thickness |
| | 20° C. 65% RH | 20° C. 90% RH | l* | t** | l + t*** | coefficient | (%) | (µm) |
| Ex.5-1 | 4.7 | 4.9 | 305 | 387 | 692 | 0.206 | 0.76 | 12.0 |
| Ex.5-2 | 4.2 | 4.4 | 318 | 394 | 712 | 0.208 | 0.78 | 12.2 |
| Ex.5-3 | 19.2 | 19.8 | — | — | — | — | 96.8 | 153 |
| C.Ex.5-1 | 30.5 | 32.3 | 498 | 560 | 1058 | 0.160 | 0.67 | 16.7 |
| C.Ex.5-2 | 7.6 | 445.7 | 341 | 329 | 670 | 0.061 | 2.08 | 14.9 |

Ex.: Example
C.Ex.: Comparative Example
(l × t)*: (longitudinal direction × transverse direction)
(Notes)
PPN: poly(1,3-propylene-2,6-naphthalate)
PET: polyethylene terephthalate
Ny6: Nylon 6
l*: longitudinal direction
t**: transverse direction
l + t***: longitudinal direction + transverse direction The polypropylene-2,6-naphthalate films of the present invention in Examples 5-1 to 5-3 have lower moisture permeability than that of PET or Nylon 6 films and lower oxygen permeability than that of a PET film, especially much lower oxygen permeability at a high humidity than that of a Nylon 6 film. Therefore, it is understood that they are excellent in gas barrier properties against oxygen, particularly gas barrier properties at a high humidity.

Examples 6-1 to 6-3

100 parts of dimethyl naphthalene-2,6-dicarboxylate, 46.7 parts of 1,3-propanediol and 0.0586 part of tetrabuthoxy titanate as a catalyst were charged into a reactor equipped with a distiller, and the reaction product was subjected to an ester exchange reaction for 150 minutes dried at 160° C. for 4 hours, supplied to the hopper of an extruder, molten at a temperature of 250° C. and extruded onto a rotary cooling drum having a surface temperature of 40° C. through a slit die to obtain an unstretched film. The thus obtained unstretched film was preheated at 80° C., stretched to 3.0 times in a longitudinal direction between low-speed and high-speed rolls by heating at 110° C. with an IR heater, and supplied to a tenter to be stretched to 3.3 times in a transverse direction at 110° C. The obtained biaxially oriented film was heat set at 145° C. for 5 seconds to obtain a 25 µm thick polyester film. The characteristic properties of the obtained film are shown in Table 6.

Example 6-4

A mixture of 100 parts of naphthalene-2,6-dicarboxylic acid and 42.2 parts of 1,3-propanediol was slurried at normal temperature and charged into an autoclave equipped with a stirrer to be esterified at 270° C. under a pressure of 3 kg/cm². After 0.0519 part of tetrabuthoxy titanate was added as a catalyst, this esterified product was transferred to a reactor equipped with a stirrer, nitrogen introduction port, vacuum port and distiller and heated at 240° C. to carry out a polycondensation reaction at normal pressure for about 5 minutes, at 15 to 20 mmHg for about 30 minutes and further at 0.1 mmHg by elevating the temperature to 260° C. After a predetermined melt viscosity was reached, the reaction product was chipped by a commonly used method to obtain pellets of poly(1,3-propylene-2,6-naphthalate) having an intrinsic viscosity of 0.63. The obtained pellets were formed into a film in the same manner as in Example 6-1. The characteristic properties of the obtained film are shown in Table 6.

Example 6-5

A biaxially oriented film was obtained in the same manner as in Example 6-1 except that pellets of polyethylene-2,6-naphthalate having an intrinsic viscosity of 0.62 were used in an amount shown in Table 6 in place of the pellets of polyethylene terephthalate having an intrinsic viscosity of 0.64. The characteristic properties of the obtained film are shown in Table 6.

Comparative Example 6-1

A biaxially oriented film was obtained from pellets of polyethylene terephthalate having an intrinsic viscosity of 0.64. The characteristic properties of the obtained film are shown in Table 6.

Pellets of this polyester were dried at 170° C. for 3 hours, supplied to the hopper of an extruder, melt extruded to a thickness of 200 μm through a 1 mm slit die at a temperature of 260° C. and brought into close contact with a rotary cooling drum having a surface temperature of 20° C. using linear electrodes to be solidified.

Thereafter, this unstretched film was preheated at 75° C., stretched to 3.0 times in a longitudinal direction between low-speed and high-speed rolls by heating with one IR heater having a surface temperature of 900° C. from 15 mm above, supplied to a tenter to be stretched to 3.6 times in a transverse direction at 105° C. and heat set at 150° C. for 3 seconds to obtain a 14 μm thick biaxially oriented film. The characteristic properties of this film are shown in Table 7.

Examples 7-2 and 7-3

A 14 μm thick biaxially oriented film was obtained in the same manner as in Example 7-1 except that a copolymerizable component was introduced in a proportion shown in Table 7. The characteristic properties of this film are shown in Table 7.

TABLE 6

| | | | | | characteristic properties of film | | |
|---|---|---|---|---|---|---|---|
| | PPN | | PET | PEN | elongation retention | ultraviolet transmission | intrinsic |
| | polymerization method | (parts) | (parts) | (parts) | (%) | (%) | viscosity |
| Ex.6-1 | ester exchange method | 95 | 5 | — | 66 | 12 | 0.59 |
| Ex.6-2 | ester exchange method | 90 | 10 | — | 62 | 14 | 0.59 |
| Ex.6-3 | ester exchange method | 85 | 15 | — | 60 | 18 | 0.58 |
| Ex.6-4 | ester exchange method | 95 | 5 | — | 64 | 12 | 0.58 |
| Ex.6-5 | direct polymerization method | 90 | — | 10 | 67 | 11 | 0.58 |
| C.Ex.6-1 | — | — | 100 | — | 40 | 81 | 0.60 |

Ex.: Example
C.Ex.: Comparative Example
(Notes)
PPN: poly(1,3-propylene-2,6-naphthalate)
PET: polyethylene terephthalate
PEN: polyethylene-2,6-naphthalate Example 7-1

0.059 part of tetrabutyl titanate was added to a mixture of 100 parts of dimethyl 2,6-naphthalene dicarboxylate and 46.7 parts of 1,3-propanediol to carry out an ester exchange reaction for 150 minutes by gradually elevating the temperature from 150° C. to 210° C. After the end of the ester exchange reaction, 0.2 part of spherical silica having an average particle diameter of 0.6 μm was added, the temperature of reaction product was elevated to 290° C., and a polycondensation reaction was carried out under a high vacuum of 0.2 mmHg or less to obtain a polyester having an intrinsic viscosity of 0.60.

TABLE 7

| | copolymerizable component | | intrinsic viscosity of polyester (dl/g) | chloroform extractability of polyester (wt %) | chloroform extractability of film (wt %) |
|---|---|---|---|---|---|
| | type | proportion (mol %) | | | |
| Ex.7-1 | none | — | 0.62 | 0.10 | 0.05 |
| Ex.7-2 | terephthalic acid | 18 | 0.60 | 0.12 | 0.10 |
| Ex.7-3 | ethylene glycol | 17 | 0.61 | 0.13 | 0.09 |

Ex.: Example

Example 8-1

0.059 part of tetrabutyl titanate was added to a mixture of 100 parts of dimethyl 2,6-naphthalene dicarboxylate and 46.7 parts of 1,3-propanediol to carry out an ester exchange reaction for 150 minutes by gradually elevating the temperature from 150° C. to 210° C. After the end of the ester exchange reaction, 0.2 part of spherical silica having an average particle diameter of 0.6 μm was added, the temperature of reaction product was elevated to 290° C., and a polycondensation reaction was carried out under a high vacuum of 0.2 mmHg or less to obtain a polyester having an intrinsic viscosity of 0.62.

Pellets of this polyester were dried at 170° C. for 3 hours, supplied to the hopper of an extruder, melt extruded to a thickness of 400 μm through a 1 mm slit die at a temperature of 260° C. and brought into close contact with a rotary cooling drum having a surface temperature of 20° C. using linear electrodes to be solidified.

Thereafter, this unstretched film was preheated at 75° C., stretched to 3.0 times in a longitudinal direction between low-speed and high-speed rolls by heating with one IR heater having a surface temperature of 900° C. from 15 mm above, supplied to a tenter to be stretched to 3.6 times in a transverse direction at 105° C. and heat set at 150° C. for 3 seconds to obtain a 35 μm thick biaxially oriented film. The characteristic properties of the film are shown in Table 8.

Examples 8-2 and 8-3

A biaxially oriented film was obtained in the same manner as in Example 8-1 except that a copolymerizable component was introduced in a proportion shown in Table 8. The characteristic properties of the film are shown in Table 8.

average particle diameter of 0.6 μm was added, the temperature of reaction product was elevated to 290° C., and a polycondensation reaction was carried out under a high vacuum of 0.2 mmHg or less to obtain a polytrimethylene-2,6-naphthalate resin having an intrinsic viscosity of 0.60.

Water was added to wet synthesized amorphous silica particles having an average particle diameter of 1.4 μm to prepare a 5% silica particle-containing water dispersion. The obtained water dispersion was uniform and had excellent slurry properties. Thereafter, the above synthesized polytrimethylene-2,6-naphthalate resin was supplied to a vented unidirectional rotary intermeshing double-screw kneading extruder having a kneading disk puddle as a screw constituent element from a vibration type quantitative feeder at a rate of 20 kg/hr, and the above silica-containing water dispersion was added using a Milton quantitative pump in such an amount that the concentration of particles contained in the polytrimethylene-2,6-naphthalate resin became 0.4 wt %. At this point, the resin was melt kneaded and extruded by setting the vacuum degree of a vent port to 1 mmHg and the cylinder temperature to 220° C. The obtained silica particle-containing polytrimethylene-2,6-naphthalate resin composition and a polytrimethylene-2,6-naphthalate resin containing no particles were mixed together to adjust the concentration of particles contained in the resin to 0.06 wt %. This polyester resin composition was dried at 170° C. for 3 hours, supplied to the hopper of an extruder, melt extruded to a thickness of 200 μm through a 1 mm slit die at a temperature of 260° C. and brought into close contact with a rotary cooling drum having a surface temperature of 20° C. using linear electrodes to be solidified. Thereafter, this unstretched film was preheated at 75° C., stretched to 3.0 times in a

TABLE 8

| | copolymerizable component | | intrinsic viscosity of polyester (dl/g) | ion exchange water extractability of polyester (mg/in²) | ion exchange water extractability of film (mg/in²) | odor retention properties |
|---|---|---|---|---|---|---|
| | type | proportion (mol %) | | | | |
| Ex.8-1 | none | — | 0.60 | 0.09 | 0.05 | ◉ |
| Ex.8-2 | terephthalic acid | 15 | 0.63 | 0.12 | 0.08 | ◉ |
| Ex.8-3 | ethylene glycol | 15 | 0.62 | 0.11 | 0.07 | ◉ |

Ex.: Example

Example 9-1

0.059 part of tetrabutyl titanate was added to a mixture of 100 parts of dimethyl 2,6-naphthalene dicarboxylate and 46.7 parts of 1,3-propanediol to carry out an ester exchange reaction for 150 minutes by gradually elevating the temperature from 150° C. to 210° C. After the end of the ester exchange reaction, 0.2 part of spherical silica having an longitudinal direction between low-speed and high-speed rolls by heating with one IR heater having a surface temperature of 900° C. from 15 mm above, supplied to a tenter to be stretched to 3.6 times in a transverse direction at 105° C. and heat set at 150° C. for 3 seconds to obtain a 14 μm thick biaxially oriented film. The characteristic properties of the film are shown in Table 9.

Examples 9-2 and 9-3

The procedure of Example 9-1 was repeated except that the average particle diameter of silica particles used in Example 9-1 was changed as shown in Table 9. The results are shown in Table 9.

Example 9-4

The procedure of Example 9-1 was repeated except that kaolin having an average particle diameter of 1.2 µm was used in place of the organic particles used in Example 9-1. The results are shown in Table 9.

TABLE 9

| | type of inorganic particles | average particle diameter of inorganic particles (µm) | properties of dispersion | temperature for adding dispersion (° C.) | dispersibility of inorganic particles in film | haze of film (%) | static friction coefficient |
|---|---|---|---|---|---|---|---|
| Ex.9-1 | silica | 1.4 | ◯ | 220 | ◯ | 3.2 | 0.36 |
| Ex.9-2 | silica | 4.5 | ◯ | 220 | ◯ | 4.1 | 0.27 |
| Ex.9-3 | silica | 0.05 | ◯ | 220 | ◯ | 2.0 | 0.85 |
| Ex.9-4 | kaolin | 1.2 | ◯ | 220 | ◯ | 3.5 | 0.40 |

Ex.: Example

Example 10-1

<Production of Copolyester>

100 parts of dimethyl 2,6-naphthalene dicarboxylate, 18 parts of dimethyl isophthalate, 3 parts of 5-sodium sulfoisophthalic acid, 54 parts of ethylene glycol and 62 parts of a bisphenol A adduct with propylene oxide represented by the following structural formula:

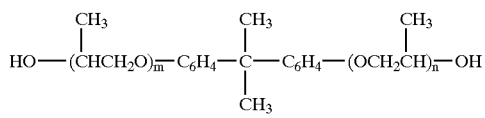

(wherein m+n is 4 (mean value), and $C_6H_4$ is a benzene ring) were charged into an ester exchange reactor, and 0.05 part of tetrabuthoxy titanate was added to carry out an ester exchange reaction by heating at 230° C. under a nitrogen atmosphere to distill off the formed methanol.

Thereafter, 0.6 part of Irganox 1010 (of Ciba Geigy Co., Ltd.) was added to this reaction system and a polycondensation reaction was carried out by gradually elevating the temperature to 255° C. and reducing the pressure of the system to 0.13 kPa to obtain a copolyester having an intrinsic viscosity of 0.64. The composition of this copolyester is shown in Table 10-1.

<Preparation of Polyester Water Dispersion>

20 parts of this copolyester was dissolved in 80 parts of tetrahydrofuran, 180 parts of water was added dropwise to the obtained solution under high-speed agitation at a rate of 10,000 rpm/min to obtain a semitranslucent bluish dispersion. This dispersion was distilled at a reduced pressure of 2.67 kPa to remove tetrahydrofuran. Thus, a polyester water dispersion having a solid content of 10 wt % was obtained. 2 parts of polyoxyethylene nonylphenyl ether (HLB=12.8) was added as a nonionic surfactant to 180 parts of the polyester water dispersion and 618 parts of water was further added to prepare a coating solution.

<Production of Polytrimethylene Naphthalate>

0.059 part of tetrabutyl titanate was added to a mixture of 100 parts of dimethyl 2,6-naphthalene dicarboxylate and 46.7 parts of 1,3-propanediol to carry out an ester exchange reaction for 150 minutes by gradually elevating the temperature from 150° C. to 210° C. After the end of the ester exchange reaction, 0.2 part of spherical silica having an average particle diameter of 0.6 µm was added, the temperature of reaction product was elevated to 290° C., and a polycondensation reaction was carried out under a high vacuum of 0.2 mmHg or less to obtain a polyester having an intrinsic viscosity of 0.60.

<Production of Adhesive Polyester Laminate Film>

Polytrimethylene naphthalate having an intrinsic viscosity of 0.60 measured at 35° C. in o-chlorophenol was melt extruded to obtain a 158 µm thick unstretched film which was then stretched to 3.5 times in a longitudinal direction, and the above prepared coating solution was coated on one side of this uniaxially oriented film.

Thereafter, the film was stretched to 3.9 times in a transverse direction at 105° C. and heat set at 200° C. for 4.2 seconds to obtain a 12.2 µm thick biaxially oriented polyester laminate film having an average coating build-up of ±20 mg/m².

The anti-block properties, water resistance, oxygen permeability (gas barrier properties), Young's moduli and Adhesion of the coated surface of this film were measured. The results are shown in Table 10-2.

Examples 10-2 to 10-7

Copolyesters having compositions shown in Table 10-1 were obtained in the same manner as in Example 10-1 except that the types and amounts of the copolymerizable components were changed as shown in Table 10-1. Polyester water dispersions and coating solutions were prepared in the same manner as in Example 10-1 except that these copolyesters were used and the stretching conditions were changed as shown in Table 10-1.

Further, biaxially oriented polyester laminate films were obtained in the same manner as in Example 10-1 except that the above coating solutions were used.

The anti-block properties, water resistance, oxygen permeability (gas barrier properties), Young's moduli and adhesion of each of the coated surfaces of the films were measured. The results are shown in Table 10-2.

As is obvious from Table 10-1 and Table 10-2, a film having excellent oxygen permeability, anti-block properties and water resistance can be obtained by employing the conditions of the present invention.

Examples 10-8 and 10-9

Copolyesters having compositions shown in Table 10-1 were obtained in the same manner as in Example 10-1 except that the types and amounts of the copolymerizable components were changed as shown in Table 10-1. Polyester water dispersions and coating solutions were prepared in the same manner as in Example 10-1 except that these copolyesters were used, the stretching conditions were changed as shown in Table 10-1, and components shown in Table 10-1 were added to polytrimethylene naphthalate.

Further, biaxially oriented polyester laminate films were obtained in the same manner as in Example 10-1 except that the above coating solutions were used.

The anti-block properties, water resistance, oxygen permeability (gas barrier properties), Young's moduli and adhesion of each of the coated surfaces of the films were measured. The results are shown in Table 10-2.

As is obvious from Table 10-1 and Table 10-2, a film having excellent adhesion, oxygen permeability, anti-block properties and water resistance can be obtained even when an acid component other than naphthalenedicarboxylic acid or a slight amount of a lubricant is partially added to polytrimethylene naphthalate.

Comparative Examples 10-1 and 10-2

Biaxially oriented polyester laminate films were obtained in the same manner as in Example 10-1 except that polytrimethylene naphthalate was changed to a polyester shown in Table 10-1.

The anti-block properties, water resistance, oxygen permeability (gas barrier properties), Young's moduli and adhesion of each of the coated surfaces of the films were measured. The results are shown in Table 10-2.

As is obvious from Table 10-1 and Table 10-2, when polytrimethylene naphthalate is not used, desired oxygen permeability cannot be obtained.

TABLE 10-1

| | composition of copolyester | | | | | | | layer other than copolyester layer | | | stretch ratios |
| --- | --- | --- | --- | --- | --- | --- | --- | --- | --- | --- | --- |
| | acid components (mol %) | | | | glycol components (mol %) | | | main polymer | copolymerizable | | |
| | NDA | IPA | TA | NSIP | EG | BPA-P | BPA-4 | composition | component | additive | (l × t)* |
| Ex.10-1 | 80 | 17 | 0 | 3 | 80 | 20 | 0 | PTN | 0 | 0 | 3.6 × 3.9 |
| Ex.10-2 | 60 | 38 | 0 | 2 | 100 | 0 | 0 | PTN | 0 | 0 | 3.6 × 3.9 |
| Ex.10-3 | 80 | 18 | 0 | 2 | 80 | 0 | 20 | PTN | 0 | 0 | 3.6 × 3.9 |
| Ex.10-4 | 80 | 19 | 0 | 1 | 80 | 20 | 0 | PTN | 0 | 0 | 3.6 × 3.9 |
| Ex.10-5 | 98 | 0 | 0 | 2 | 80 | 20 | 0 | PTN | 0 | 0 | 3.6 × 3.9 |
| Ex.10-6 | 60 | 30 | 8 | 2 | 80 | 20 | 0 | PTN | 0 | 0 | 3.6 × 3.9 |
| Ex.10-7 | 80 | 17 | 0 | 3 | 80 | 20 | 0 | PTN | 0 | 0 | 4.1 × 4.2 |
| Ex.10-8 | 80 | 17 | 0 | 3 | 80 | 20 | 0 | PTN(90 mol %) | TA(10 mol %) | 0 | 3.6 × 3.9 |
| Ex.10-9 | 80 | 17 | 0 | 3 | 80 | 20 | 0 | PTN | 0 | silica(0.1%) | 3.6 × 3.9 |
| C.Ex.10-1 | 80 | 17 | 0 | 3 | 80 | 20 | 0 | PET | 0 | 0 | 3.6 × 3.9 |
| C.Ex.10-2 | 80 | 17 | 0 | 3 | 80 | 20 | 0 | PEN | 0 | 0 | 3.6 × 3.9 |

Ex.: Example
C.Ex.: Comparative Example
(l × t)*: (longitudinal direction × transverse direction)
(notes)
NDA: 2,6-naphthalenedicarboxylic acid
IPA: isophthalic acid
TA: terephthalic acid
NSIP: 5-sodium sulfoisophthalic acid
EG: ethylene glycol
BPA-P: bisphenol A adduct with propylene oxide
BPA-4: bisphenol A adduct with ethylene oxide
PTN: polytrimethylene naphthalate
PET: polyethylene terephthalate
PEN: polyethylene naphthalate

TABLE 10-2

| | characteristic properties of film | | | | | | | |
| --- | --- | --- | --- | --- | --- | --- | --- | --- |
| | Young's moduli (kg/mm$^2$) | | | delamination | anti-block properties | water | adhesion | oxygen permeability |
| | l* | t** | l + t*** | resistance | (g) | resistance | (g) | cc · cm/cm$^2$ · sec · kPa |
| Ex.10-1 | 298 | 310 | 608 | 30 | 3 | ○ | 40 | 6.4 |
| Ex.10-2 | 293 | 312 | 605 | 29 | 5 | ○ | 41 | 6.4 |
| Ex.10-3 | 297 | 315 | 612 | 30 | 4 | ○ | 40 | 6.4 |
| Ex.10-4 | 291 | 320 | 611 | 30 | 3 | ○ | 43 | 6.4 |
| Ex.10-5 | 290 | 321 | 611 | 31 | 3 | ○ | 42 | 6.4 |
| Ex.10-6 | 295 | 315 | 610 | 32 | 4 | ○ | 41 | 6.4 |
| Ex.10-7 | 352 | 340 | 692 | 34 | 3 | ○ | 41 | 6.4 |
| Ex.10-8 | 297 | 315 | 612 | 32 | 3 | ○ | 43 | 6.4 |

TABLE 10-2-continued

| | characteristic properties of film | | | | | | | |
|---|---|---|---|---|---|---|---|---|
| | Young's moduli (kg/mm²) | | | delamination resistance | anti-block properties (g) | water resistance | adhesion (g) | oxygen permeability cc · cm/cm² · sec · kPa |
| | l* | t** | l + t*** | | | | | |
| Ex.10-9 | 290 | 311 | 601 | 31 | 3 | ○ | 40 | 6.4 |
| C.Ex.10-1 | 513 | 508 | 1021 | 0 | 4 | ○ | 41 | 40.6 |
| C.Ex.10-2 | 600 | 651 | 1251 | 42 | 4 | ○ | 42 | 11.7 |

Ex.: Example
C.Ex.: Comparative Example
l*: longitudinal direction
t**: transverse direction
l + t***: longitudinal direction + transverse direction Examples 11-1 to 11-3

An ester exchange reaction was carried out between 100 parts of dimethyl naphthalene-2,6-dicarboxylate and 46.7 parts of 1,3-propanediol in the presence of 0.03 part of manganese acetate tetrahydrate as an ester exchange catalyst in accordance with a commonly used method, and 0.023 part of trimethyl phosphate was added to substantially terminate the ester exchange reaction.

Thereafter, antimony trioxide was added as a polymerization catalyst to ensure that the amount of antimony contained in the produced resin composition should be such as shown in Table 11 and then a polycondensation reaction was carried out at a high temperature under high vacuum in accordance with a commonly used method to obtain poly-(1,3-propylene)-2,6-naphthalate. The quality of this polymer is shown in Table 11.

Pellets of this polyester were dried at 160° C. for 4 hours, supplied to the hopper of an extruder, molten at a temperature of 250° C. and extruded onto a rotary cooling drum having a surface temperature of 40° C. through a slit die to obtain an unstretched film. The thus obtained unstretched film was preheated at 80° C., stretched to 3.0 times in a longitudinal direction between low-speed and high-speed rolls by heating at 110° C. with an IR heater and then supplied to a tenter to be stretched to 3.3 times in a transverse direction at 110° C. The obtained biaxially oriented film was heat set at 145° C. for 5 seconds to obtain a 25 μm thick polyester film. The evaluation result of the surface defects of the film is shown in Table 11.

Examples 12-1 to 12-3

An ester exchange reaction was carried out between 100 parts of dimethyl naphthalene-2,6-dicarboxylate and 46.7 parts of 1,3-propanediol in the presence of titanium tetrabutoxide as a catalyst in accordance with a commonly used method to ensure that the amount of titanium contained in the obtained polyester should be such as shown in Table 12. Thereafter, a polycondensation reaction was carried out at a high polymerization temperature shown in Table 12 under high vacuum in accordance with a commonly used method to obtain poly-(1,3-propylene-2,6-naphthalate). The quality of this polymer is shown in Table 12.

Pellets of this polyester were dried at 160° C. for 4 hours, supplied to the hopper of an extruder molten at a temperature of 250° C. and extruded onto a rotary cooling drum having a surface temperature of 40° C. through a slit die to obtain an unstretched film. The thus obtained unstretched film was preheated at 80° C., stretched to 3.0 times in a longitudinal direction between low-speed and high-speed rolls by heating at 110° C. with an IR heater and then supplied to a tenter to be stretched to 3.3 times in a transverse direction at 110° C. The obtained biaxially oriented film was heat set at 145° C. for 5 seconds to obtain a 25 μm thick polyester film. The evaluation result of the surface defects of the film is shown in Table 12.

TABLE 11

| | polymerization temperature (° C.) | intrinsic viscosity (ml/g) | quantity of metal Sb (ppm) | number of foreign substances of 50 μm or more in size | surface defects of biaxially oriented film |
|---|---|---|---|---|---|
| Ex.11-1 | 280 | 0.602 | 200 | 14 | ⊚ |
| Ex.11-2 | 280 | 0.601 | 350 | 31 | ○ |
| Ex.11-3 | 280 | 0.610 | 160 | 12 | ⊚ |

Ex.: Example

TABLE 12

|  | polymerization temperature (° C.) | intrinsic viscosity (ml/g) | color (L-b) | color (b) | quantity of metal Ti (ppm) | number of foreign substances of 50 μm or more in size | surface defects of biaxially oriented film |
|---|---|---|---|---|---|---|---|
| Ex.12-1 | 260 | 0.643 | 77 | 7 | 70 | 0 | ◎ |
| Ex.12-2 | 260 | 0.651 | 76 | 8 | 76 | 0 | ◎ |
| Ex.12-3 | 260 | 0.636 | 78 | 5 | 78 | 0 | ◎ |

Ex.: Example
(notes)
L value: indicating brightness and the larger the value, the higher the brightness becomes.
b value: the larger the value, the more the yellowness increases.
L-b value: the larger the value, the more the whiteness increases.

Examples 13-1 to 13-3

An ester exchange reaction was carried out between 100 parts of dimethyl naphthalene-2,6-dicarboxylate and 46.7 parts of 1,3-propanediol in the presence of 0.0055 part of tetrabuthoxy titanate as an ester exchange catalyst in accordance with a commonly used method, and 0.0086 part of trimethyl phosphate was added to substantially terminate the ester exchange reaction.

Thereafter, amorphous germanium dioxide was added as a polymerization catalyst to ensure that the amount of metal germanium contained in the produced polymer should be as shown in Table 13 and then a polycondensation reaction was carried out at a high temperature under high vacuum in accordance with a commonly used method to obtain poly (1,3-propylene-2,6-naphthalate). The quality of this polymer is shown in Table 13.

Pellets of this polyester were dried at 160° C. for 4 hours, supplied to the hopper of an extruder, molten at a temperature of 250° C. and extruded onto a rotary cooling drum having a surface temperature of 40° C. through a slit die to obtain an unstretched film. The thus obtained unstretched film was preheated at 80° C., stretched to 3.0 times in a longitudinal direction between low-speed and high-speed rolls by heating at 110° C. with an IR heater, and then supplied to a tenter to be stretched to 3.3 times in a transverse direction at 110° C. The obtained biaxially oriented film was heat set at 145° C. for 5 seconds to obtain a 25 μm thick polyester film. The evaluation result of the surface defects of the film is shown in Table 13.

As is obvious from the results shown in Table 13, the polyester film of the present invention is excellent in color and surface properties with a small number of foreign substances.

46.7 parts of 1,3-propanediol to carry out an ester exchange reaction for 150 minutes by gradually elevating the temperature from 15° C. to 210° C. After the end of the ester exchange reaction, 0.5 part of the SEABIO ZO-100 of Hoyu System Co., Ltd. (Mg$_{0.9}$Zn$_{0.1}$O; average particle diameter of 0.5 μm) was added as an inorganic anti-fungus agent, the temperature of reaction product was elevated to 290° C., and a polycondensation reaction was carried out under a high vacuum of 0.2 mmHg or less to obtain a polytrimethylene-2,6-naphthalate resin having an intrinsic viscosity of 0.60.

The above polytrimethylene-2,6-naphthalate resin was dried at 145° C. for 4 hours, supplied to the hopper of an extruder, molten at a temperature of 280° C., extruded onto a rotary cooling drum having a surface temperature of 25° C. through a 1 mm slit die and quenched to obtain an unstretched film.

The thus obtained unstretched film was wound round a roll to be heated, stretched to 3.6 times in a longitudinal direction, and then supplied to a tenter to be stretched to 3.9 times in a transverse direction at 105° C. The obtained biaxially oriented film was heat set at 140° C. and relaxed by 4% in a transverse direction at 135° C. to obtain a 12 μm thick biaxially oriented film. The physical properties of the obtained film are shown in Table 14.

Comparative Example 14-1

The procedure of Example 14-1 was repeated except that the polyester resin used in Example 14-1 was changed to polyethylene terephthalate, the drying conditions before a film was formed were 170° C.×3 hours, the melting temperature of the extruder for film formation was changed to 290° C., and the heat setting temperature was changed to 200° C. The physical properties of this film are shown in Table 14.

TABLE 13

|  | polymerization temperature (° C.) | intrinsic viscosity (ml/g) | color (L-b) | color (b) | quantity of metal Ge (ppm) | number of foreign substances of 50 μm or more in size | surface defects of biaxially oriented film |
|---|---|---|---|---|---|---|---|
| Ex.13-1 | 280 | 0.625 | 71 | 6 | 200 | 0 | ◎ |
| Ex.13-2 | 280 | 0.603 | 71 | 5 | 150 | 0 | ◎ |
| Ex.13-3 | 280 | 0.630 | 70 | 6 | 250 | 0 | ◎ |

Ex.: Example
(notes)
L value: indicating brightness and the larger the value, the higher the brightness becomes.
b value: the larger the value, the more the yellowness increases.
L-b value: the larger the value, the more the whiteness increases.

Example 14-1

0.059 part of tetrabuthoxy titanate was added to a mixture of 100 parts of dimethyl naphthalene-2,6-dicarboxylate and This polyethylene terephthalate was synthesized as follows. An ester exchange reaction was carried out by adding 0.038 part of manganese acetate.tetrahydrate to a mixture of 100 parts of dimethyl terephthalate and 70 parts of ethylene glycol and gradually elevating the temperature from 150° C. to 240° C. When the reaction temperature reached 170° C., 0.04 part of antimony trioxide was added, and 0.049 part of trimethyl phosphate and 0.5 part of the SEABIO ZO-100 of Hoyu System Co., Ltd. ($Mg_{0.9}Zn_{0.1}O$; average particle diameter of 0.5 µm) as an inorganic anti-fungus agent were added after the end of the ester exchange reaction. Thereafter, the temperature of reaction product was elevated to 290° C. and a polycondensation reaction was carried out under a high vacuum of 0.2 mmHg or less to obtain a polyethylene terephthalate resin having an intrinsic viscosity of 0.60.

Comparative Example 14-2

The procedure of Example 14-1 was repeated except that the polyester used in Example 14-1 was changed to a polyethylene-2,6-naphthalate resin, the melt extrusion temperature for forming a film was changed to 305° C., the stretching temperature in a transverse direction was changed to 145° C. and the heat setting temperature was changed to 220° C. The physical properties of this film are shown in Table 14.

This polyethylene-2,6-naphthalate was synthesized as follows.

An ester exchange reaction was carried out by adding 0.018 part of manganese acetate.tetrahydrate to a mixture of 100 parts of dimethyl 2,6-naphthalene dicarboxylate and 50 parts of ethylene glycol and gradually elevating the temperature from 150° C. to 240° C. After the end of the ester exchange reaction, 0.013 part of trimethyl phosphate and 0.008 part of titanium acetate were added and then 1 part of the SEABIO ZO-100 of Hoyu System Co., Ltd. ($Mg_{0.9}Zn_{0.1}O$; average particle diameter of 0.5 µm) was added as an inorganic anti-fungus agent. Thereafter, the temperature of reaction product was elevated to 290° C. and a polycondensation reaction was carried out under a high vacuum of 0.2 mmHg or less to obtain a polyethylene-2,6-naphthalate resin having an intrinsic viscosity of 0.60.

Examples 14-2 and 14-3

The procedure of Example 14-1 was repeated except that the SEABIO ZO-100 of Hoyu System Co., Ltd. ($Mg_{0.9}Zn_{0.1}O$) having a particle size and concentration shown in Table 14 was contained as an inorganic anti-fungus agent.

The physical properties of the obtained films are shown in Table 14.

Example 14-4

The procedure of Example 14-1 was repeated except that 1 part of an inorganic compound carrying silver ions (Novalon AG300 of Toagosei Chemical Industry Co., Ltd.; average particle diameter of 0.8 µm) was added as an inorganic anti-fungus agent. The physical properties of this film are shown in Table 14.

An antifungal test was made on a total of 8 films obtained in the above Examples 14-1 to 14-4 and Comparative Examples 14-1 to 14-4 in accordance with the following method.

(Bacilli to be Tested)

*Escherichia coli* IFO 3972

*Staphylococcus aureus* IFO 12732

(Test Media)

NA medium: general agar medium

NB medium: general broth medium containing 0.2 of meat extract

1/500 NB medium: NB medium is diluted 500 times with purified water to adjust pH to 7.0±0.2

SCDLP medium: SCDLP medium

SA medium: standard agar medium (Preparation of Bacillus Solution)

The bacilli to be tested are cultured in an NA medium at 37±1° C. for 16 to 24 hours, inoculated in an NA medium again and cultured at 37±1° C. for 16 to 20 hours. The bacilli after culture are uniformly dispersed in a 1/500 NB medium to adjust the number of bacilli per 1 ml to $2.0 \times 10^5$ to $1.0 \times 10^6$.

(Preparation of Sample)

A specimen is cut to a size of 5 cm×5 cm to prepare a sample.

(Test Operation)

0.5 ml of the bacillus solution is added dropwise to three samples of specimen and covered with a polyethylene film in such a manner that the film is in close contact with the samples. This is kept at 35±1° C. and a relative humidity of 90% or more.

A plastic Petri dish is used as a control sample and tested in the same manner as described above.

(Measurement of Number of Bacilli)

After 24 hours of storage, living bacilli are washed out from each sample using 10 ml of an SCDLP medium and the number of living bacilli contained in the washing solution is counted by an agar plate test method (35° C., 2 days of culture) using SA medium to calculate the number of bacilli per sample.

The measurement right after inoculation is carried out by a control test.

As the results of the above test, the bacilli reduction rate is calculated from the following equation to evaluate anti-fungal properties. The results are shown in Table 14.

$$\text{bacilli reduction rate} = (A-B)/A \times 100$$

wherein A is the number of living bacilli in a film containing no anti-fungus agent and B is the number of living bacilli contained in a film containing an anti-fungus agent.

TABLE 14

| | polyester | | inorganic anti-fungus agent | | | characteristic properties of film | | | |
|---|---|---|---|---|---|---|---|---|---|
| | acid component | glycol component | type | average particle diameter ($\mu$m) | quantity (wt %) | intrinsic viscosity (dl/g) | gas permeability (cc·cm/cm²·sec·cmHg) | haze (%) | bacilli reduction rate (%) |
| Ex.14-1 | NDC | 1,3-PG | composite metal oxide | 0.5 | 0.5 | 0.60 | $5.5 \times 10^{-13}$ | 5 | 100 |
| Ex.14-2 | NDC | 1,3-PG | composite metal oxide | 0.5 | 5.0 | 0.60 | $5.5 \times 10^{-13}$ | 15 | 100 |
| Ex.14-3 | NDC | 1,3-PG | composite metal oxide | 5.0 | 0.3 | 0.60 | $5.5 \times 10^{-13}$ | 12 | 100 |
| Ex.14-4 | NDC | 1,3-PG | silver-based inorganic compound | 0.8 | 1.0 | 0.60 | $5.5 \times 10^{-13}$ | 9 | 100 |
| C.Ex.14-1 | TA | EG | composite metal oxide | 0.5 | 0.5 | 0.60 | $21.5 \times 10^{-13}$ | 4 | 100 |
| C.Ex.14-2 | NDC | EG | composite metal oxide | 0.5 | 0.5 | 0.60 | $10.0 \times 10^{-13}$ | 4 | 100 |

Ex.: Example
C.Ex.: Comparative Example
(notes)
NDA: 2,6-naphthalenedicarboxylic acid
1,3-PG: 1,3-propanediol
TA: terephthalic acid
EG: ethylene glycol It is understood from the results of Table 14 that the films of Examples are excellent in antifungal properties, transparency and gas barrier properties.

What is claimed is:

1. An aromatic polyester film, (1) which consists of an aromatic polyester comprising 2,6-naphthalenedicarboxylic acid as the main dicarboxylic acid component and 1,3-propanediol as the main diol component and (2) having a density of at least 1.310 g/cm³.

2. The aromatic polyester film of claim 1, wherein the aromatic polyester is a homopolymer consisting of 2,6-naphthalenedicarboxylic acid as a dicarboxylic acid component and 1,3-propanediol as a diol component.

3. The aromatic polyester film of claim 1, wherein the aromatic polyester is a copolymer comprising, as a copolymerized component, at least one compound selected from the group consisting of dicarboxylic acids other than 2,6-naphthalenedicarboxylic acid and diols other than 1,3-propanediol in an amount of 30 mol % or less based on the total of all the dicarboxylic acid components.

4. The aromatic polyester film, (1) which comprises an aromatic polyester comprising 2,6-naphthalenedicarboxylic acid as the main dicarboxylic acid component and 1,3-propanediol as the main diol component and (2) having a density of at least 1.310 g/cm³, wherein the aromatic polyester is a copolymer comprising, as a copolymerized component, a sulfonic acid quaternary phosphonium salt having an ester forming functional group in an amount of 0.1 to 45 mmol % based on the total of all dicarboxylic acid components.

5. The aromatic polyester film of claim 1, wherein the aromatic polyester has an intrinsic viscosity of 0.4 to 1.5.

6. The aromatic polyester film of claim 1 which is biaxially oriented.

7. The aromatic polyester film of claim 6 which has a density of at least 1.320 g/cm³.

8. The aromatic polyester film of claim 6 which has a tear strength of 0.25 kg/mm or less.

9. The aromatic polyester film of claim 6 which has a ratio of piercing strength to tear strength of 4 or more when the film is 15 $\mu$m thick.

10. The aromatic polyester film of claim 6 which has a total of Young's moduli in two crossing directions on the film plane of 350 to 1,300 kg/mm².

11. The aromatic polyester film of claim 6 which has a total of breaking strengths in two crossing directions on the film plane of 30 kg/mm² or more.

12. The aromatic polyester film of claim 6 which has a plane orientation coefficient of 0.02 to 0.3.

13. The aromatic polyester film of claim 6 which has a haze of 20% or less.

14. The aromatic polyester film of claim 1 which has an oxygen permeability at 20° C. and a relative humidity of 90% of $22 \times 10^{-13}$ cc·cm/cm²/sec/cmHg or less.

15. The aromatic polyester film of claim 6 which has a moisture permeability at 20° C. and a relative humidity of 90% of 30 g/m²/24 hr or less when it is 12 $\mu$m thick.

16. The aromatic polyester film of claim 1 which has a breaking elongation retention of 50% or more after 150 hours of irradiation at 60° C. with a sunshine weatherometer.

17. The aromatic polyester film of claim 1 which has a transmission of ultraviolet radiation having a wavelength of 360 nm of 40% or less.

18. The aromatic polyester film of claim 1 which has an ion exchange water extractability at 125° C. for 1 hour of 0.0155 mg/cm² or less.

19. The aromatic polyester film of claim 1 which has an oligomer extractability with chloroform of 0.15 wt % or less.

20. The aromatic polyester film of claim 1 which contains inert fine particles having an average particle diameter of 0.05 to 5 $\mu$m.

21. The aromatic polyester film of claim 1 which has a thickness of 400 $\mu$m or less.

22. A laminated polyester film consisting of the aromatic polyester film of claim 1 and another polyester layer existent on at least one side of the film.

23. The laminated polyester film of claim 22, wherein the another polyester layer satisfies the following expressions (1) to (5):

$$40 \leq NDA+TA < 100 \quad (1)$$

$$0 < SD \leq 5 \quad (2)$$

$$0 \leq OD \leq 60 \quad (3)$$

$$40 \leq EG+TMG \leq 100 \quad (4)$$

$$0 \leq BPAO \leq 60 \quad (5)$$

wherein NDA, TA, SD and OD are mol % of 2,6-naphthalenedicarboxylic acid, terephthalic acid, aromatic dicarboxylic acid having a sulfonate salt group and another aromatic dicarboxylic acid based on the total of all the dicarboxylic acid components, respectively, and EG, TMG and BPAO are mol % of ethylene glycol, tetramethylene glycol and bisphenol A adduct with a lower alkylene oxide based on the total of all the diol components, respectively.

24. An aromatic polyester comprising 2,6-naphthalenedicarboxylic acid as the main dicarboxylic acid component, 1,3-propanediol as the main diol component and a sulfonic acid quaternary phosphonium salt having ester forming functional group or groups in an amount of 0.1 to 45 mmol % based on the total of all the dicarboxylic acid components.

25. The aromatic polyester of claim 24 whose main dicarboxylic acid component is substantially 2,6-naphthalenedicarboxylic acid and whose main diol component is substantially 1,3-propanediol.

26. The aromatic polyester of claim 24 which is a copolymer comprising, as a copolymerized component, at least one compound selected from the group consisting of dicarboxylic acids other than 2,6-naphthalenedicarboxylic acid and diols other than 1,3-propanediol in an amount of 30 mol % or less based on the total of all the dicarboxylic acid components.

27. The aromatic polyester of claim 24 which contains an antimony compound in an amount of 70 to 400 ppm in terms of antimony atoms.

28. The aromatic polyester of claim 24 which contains a titanium compound in an amount of 15 to 300 ppm in terms of titanium atoms.

29. The aromatic polyester of claim 24 which contains a germanium compound in an amount of 30 to 400 ppm in terms of germanium atoms.

30. The aromatic polyester of claim 24 which satisfies the following expressions (6) and (7):

$$65 \leq L-b \quad (6)$$

$$b \leq 10 \quad (7)$$

wherein L and b are L and b values measured by a color different meter, respectively.

31. The aromatic polyester of claim 24 which contains only 50 foreign substances of 10 $\mu$m or more in size per 1 g of the aromatic polyester.

32. A polyester composition comprising the aromatic polyester of claim 24 in an amount of 60 wt % or more and another aromatic polyester in an amount of 40 wt % or less based on the total weight of the aromatic polyester and the another aromatic polyester.

33. The aromatic polyester composition of claim 32, wherein the another aromatic polyester is selected from the group consisting of polyethylene terephthalate, polyethylene-2,6-naphthalene dicarboxylate, polytetramethylene terephthalate, polytetramethylene-2,6-naphthalene dicarboxylate, polyhexamethylene terephthalate, polyhexamethylene-2,6-naphthalene dicarboxylate and copolymers thereof.

34. An antifungal polyester composition comprising the aromatic polyester of claim 24 or the aromatic polyester composition of claim 33 and an inorganic anti-fungus agent in an amount of 0.1 to 10 wt % based on the aromatic polyester of claim 24 or the aromatic polyester composition of claim 33.

35. The aromatic polyester film of claim 4, wherein the aromatic polyester is a homopolymer consisting of 2,6-naphthalenedicarboxylic acid as a dicarboxylic acid component and 1,3-propanediol as a diol component.

36. The aromatic polyester film of claim 4, wherein the aromatic polyester is a copolymer comprising, as a copolymerized component, at least one compound selected from the group consisting of dicarboxylic acids other than 2,6-naphthalenedicarboxylic acid and diols other than 1,3-propanediol in an amount of 30 mol % or less based on the total of all the dicarboxylic acid components.

37. The aromatic polyester film of claim 4, wherein the aromatic polyester has an intrinsic viscosity of 0.4 to 1.5.

38. The aromatic polyester film of claim 4 which is biaxially oriented.

39. The aromatic polyester film of claim 38 which has a density of at least 1.320 g/cm$^3$.

40. The aromatic polyester film of claim 38 which has a tear strength of 0.25 kg/mm or less.

41. The aromatic polyester film of claim 38 which has a ratio of piercing strength to tear strength of 4 or more when the film is 15 $\mu$m thick.

42. The aromatic polyester film of claim 38 which has a total of Young's moduli in two crossing directions on the film plane of 350 to 1,300 kg/mm$^2$.

43. The aromatic polyester film of claim 38 which has a total of breaking strengths in two crossing directions on the film plane of 30 kg/mm$^2$ or more.

44. The aromatic polyester film of claim 38 which has a plane orientation coefficient of 0.02 to 0.3.

45. The aromatic polyester film of claim 38 which has a haze of 20% or less.

46. The aromatic polyester film of claim 4 which has an oxygen permeability at 20° C. and a relative humidity of 90% of 22×10$^{-13}$ cc·cm/cm$^2$/sec/cmHg or less.

47. The aromatic polyester film of claim 38 which has a moisture permeability at 20° C. and a relative humidity of 90% of 30 g/m$^2$/24 hr or less when it is 12 $\mu$m thick.

48. The aromatic polyester film of claim 4 which has a breaking elongation retention of 50% or more after 150 hours of irradiation at 60° C. with a sunshine weatherometer.

49. The aromatic polyester film of claim 4 which has a transmission of ultraviolet radiation having a wavelength of 360 nm of 40% or less.

50. The aromatic polyester film of claim 4 which has an ion exchange water extractability at 125° C. for 1 hour of 0.0155 mg/cm$^2$ or less.

51. The aromatic polyester film of claim 4 which has an oligomer extractability with chloroform of 0.15 wt % or less.

52. The aromatic polyester film of claim 4 which contains inert fine particles having an average particle diameter of 0.05 to 5 $\mu$m.

53. The aromatic polyester film of claim 4 which has a thickness of 400 $\mu$m or less.

* * * * *